US012732285B2

(12) United States Patent
Murphy et al.

(10) Patent No.: US 12,732,285 B2
(45) Date of Patent: Sep. 8, 2026

(54) COMBINED RADIO ALTIMETER AND DOPPLER RADAR WITH SURFACE-MOUNTABLE ANTENNA ARRAY AND LOOP-BACK CALIBRATION

(71) Applicant: THE BOEING COMPANY, Arlington, VA (US)

(72) Inventors: Timothy Allen Murphy, Marysville, WA (US); Rongsheng Li, Menifee, CA (US); Alireza Shapoury, Santa Ana, CA (US)

(73) Assignee: THE BOEING COMPANY, Arlington, VA (US)

( * ) Notice: Subject to any disclaimer, the term of this patent is extended or adjusted under 35 U.S.C. 154(b) by 126 days.

(21) Appl. No.: 18/793,381

(22) Filed: Aug. 2, 2024

(65) Prior Publication Data

US 2025/0317220 A1 Oct. 9, 2025

Related U.S. Application Data

(63) Continuation-in-part of application No. 18/627,220, filed on Apr. 4, 2024, and a continuation-in-part of (Continued)

(51) Int. Cl.
*H01Q 1/28* (2006.01)
*H01Q 1/32* (2006.01)
(Continued)

(52) U.S. Cl.
CPC ............ *H04B 17/12* (2015.01); *H04B 17/13* (2015.01); *H04B 17/22* (2023.05)

(58) Field of Classification Search
CPC ............ H01Q 1/282; H01Q 1/28; H01Q 1/32; H01Q 9/04; H01Q 9/0407; H01Q 21/06;
(Continued)

(56) References Cited

U.S. PATENT DOCUMENTS 7,576,686 B2 * 8/2009 Needham .............. G01S 13/767 342/174
9,939,524 B2 4/2018 Winstead
(Continued)

FOREIGN PATENT DOCUMENTS

EP 3379295 A1 9/2018

OTHER PUBLICATIONS

Extended European Search Report for application No. 2518772.1 dated Jul. 25, 2025, pp. 1-11.

*Primary Examiner* — Tho G Phan
(74) *Attorney, Agent, or Firm* — Moore IP Law

(57) ABSTRACT

A radio device includes a radio frequency (RF) unit and a surface-mountable antenna module coupled to the RF unit via an electrical connector. The RF unit includes first transmit circuitry, first receive circuitry, and a processing unit, and the surface-mountable antenna module includes a housing, second receive circuitry, and second transmit circuitry. During a calibration procedure, the RF unit is configured to output a calibration RF signal via the electrical connector, receive a first bitstream representing a sampled calibration signal via the electrical connector, and determine a time delay associated with the electrical connector based on the digitized calibration signal and the first bitstream. During the calibration procedure, the surface-mountable antenna module is configured to receive the calibration RF signal via the electrical connector, sample the calibration RF signal to generate the sampled calibration signal, and output the sampled calibration signal via the electrical connector as the first bitstream.

22 Claims, 14 Drawing Sheets

Related U.S. Application Data application No. 18/627,237, filed on Apr. 4, 2024, now Pat. No. 12,438,582, and a continuation-in-part of application No. 18/627,187, filed on Apr. 4, 2024.

(51) Int. Cl.

*H04B 17/12* (2015.01)
*H04B 17/13* (2015.01)
*H04B 17/21* (2015.01)

(58) Field of Classification Search

CPC ........ H01Q 21/065; H01Q 23/00; H04B 7/04; H04B 7/0408; H04B 7/0426; H04B 7/06; H04B 17/12; H04B 17/13; H04B 17/22; G01S 7/03; G01S 13/60; G01S 13/88; G01S 13/44

See application file for complete search history.

(56) References Cited

U.S. PATENT DOCUMENTS 10,006,991 B2 6/2018 Winstead et al.
10,989,802 B2 4/2021 Pos et al.
11,131,751 B2 * 9/2021 Steinmetz ............. G01S 7/4052
11,658,398 B1 5/2023 Downey et al.
12,158,538 B2 * 12/2024 Longman .............. G01S 13/003
12,181,602 B2 * 12/2024 Green ................... G01S 7/4082
12,235,386 B2 * 2/2025 Bar-Shalom .......... G01S 13/931
12,438,582 B1 10/2025 Murphy et al.
12,494,592 B2 * 12/2025 Bar Shalom ........... H01Q 3/267
2021/0208247 A1 7/2021 John Wilson et al.
2024/0361466 A1 10/2024 Weger
2025/0314740 A1 10/2025 Murphy et al.
2025/0316912 A1 10/2025 Murphy et al.

* cited by examiner

COMBINED RADIO ALTIMETER AND DOPPLER RADAR WITH SURFACE-MOUNTABLE ANTENNA ARRAY AND LOOP-BACK CALIBRATION

CROSS-REFERENCE TO RELATED APPLICATIONS

The present application claims priority from and is a continuation-in-part of pending U.S. patent application Ser. No. 18/627,187 entitled "COMBINED RADIO ALTIMETER AND DOPPLER RADAR WITH SURFACE-MOUNTABLE ANTENNA ARRAY," filed Apr. 4, 2024, pending U.S. patent application Ser. No. 18/627,220 entitled "COMBINED RADIO ALTIMETER AND DOPPLER RADAR WITH SURFACE-MOUNTABLE ANTENNA ARRAY," filed Apr. 4, 2024, and pending U.S. patent application Ser. No. 18/627,237 entitled "COMBINED RADIO ALTIMETER AND DOPPLER RADAR WITH SURFACE-MOUNTABLE ANTENNA ARRAY," filed Apr. 4, 2024, the contents of each of which are incorporated herein by reference in their entirety.

FIELD OF THE DISCLOSURE

The present disclosure is generally related to a radio device that includes a surface-mountable antenna array and is configured to operate as a combined radio altimeter and Doppler radar that is calibrated using a loop-back calibration procedure.

BACKGROUND

As technology advances, global positioning satellite (GPS)-based navigation systems have become a common type of navigation system employed by aircraft and other long-range vehicles. GPS-based navigation systems use radio communications between an aircraft and satellites to derive accurate location information for the aircraft during flight. GPS-based navigation systems have grown in popularity due to their accuracy and reliability, as well as being easier and cheaper to deploy and calibrate than other types of navigation systems. However, GPS-based navigation systems can have some drawbacks, including being unable to function in areas in which the availability and quality of satellite signals is insufficient, as well as experiencing interference from other wireless communications and the possibility of being jammed or spoofed by malicious entities.

To compensate for these drawbacks in GPS-based navigation systems, aircraft are often equipped with other sensors or inertial navigation systems that can be used to determine measurements, such as altitude, speed, orientation, or the like, that can be used in place of, or to supplement, GPS-based location measurements. One type of sensor that is often deployed with the aircraft is a radio altimeter, which typically includes an antenna mounted to a surface of the aircraft and a line replaceable unit (LRU) that sends radio frequency (RF) signals to and receives return RF signals from the antenna via RF cabling. The radio altimeter is configured to measure a height of the aircraft above the ground using a transmitted RF wave and a reflected RF wave from the ground below the aircraft. These radio altimeters can introduce additional fault conditions and design requirements, and can also be subject to interference, jamming, or spoofing. Additionally, the RF cabling introduces delay into the measurements by the radio altimeter which must be compensated for, typically by controlling the length of cables on installation and removal of the cable delay mathematically.

In addition to radio altimeters, Doppler radars have been deployed in order to measure ground speed independent of GPS or inertial measurements. Prior to the availability of GPS, Doppler radars were deployed and integrated with inertial systems to improve platform navigation performance. As the availability of GPS increased, the effectiveness and low cost of using GPS for calibrating inertial measurement systems led to decreased demand for Doppler radars. However, as wireless communication technology has evolved, incidents of denial of GPS service, such as due to jamming or spoofing, and interference from other wireless communication technologies has reduced the reliability of GPS-supported inertial navigation systems.

SUMMARY

In a particular implementation, a radio device includes a radio frequency (RF) unit that includes first transmit circuitry, first receive circuitry, and a processing unit. The first transmit circuitry is configured to output, via an electrical connector during a calibration procedure, a calibration RF signal based on a digitized calibration signal. The first receive circuitry is configured to receive, via the electrical connector during the calibration procedure, a first bitstream representing a sampled calibration signal. The processing unit is configured to determine a time delay associated with the electrical connector based on the digitized calibration signal and the first bitstream. The radio device also includes a surface-mountable antenna module configured to be coupled to the RF unit via the electrical connector. The surface-mountable antenna module includes a housing, second receive circuitry, and second transmit circuitry. The housing is configured to mount to an external surface of a vehicle. The second receive circuitry is configured to receive, via the electrical connector during the calibration procedure, the calibration RF signal. The second transmit circuitry is configured to, during the calibration procedure: sample the calibration RF signal to generate the sampled calibration signal and output, via the electrical connector, the sampled calibration signal as the first bitstream.

In another particular implementation, a method includes, during a calibration procedure at an RF unit, generating a calibration RF signal based on a digitized calibration signal. The method also includes, during the calibration procedure, communicating the calibration RF signal to an antenna module via an electrical connector. The antenna module is coupled to a surface of a vehicle and includes an antenna. The electrical connector is coupled to the antenna module and the RF unit. The method includes, during the calibration procedure, receiving a first bitstream from the antenna module via the electrical connector. The first bitstream represents a sampled calibration signal. The method further includes, during the calibration procedure, determining a time delay associated with the electrical connector based on the digitized calibration signal and the first bitstream.

In another particular implementation, a method includes, during a calibration procedure at an antenna module that is coupled to a surface of a vehicle and includes an antenna, receiving a calibration RF signal from an RF unit via an electrical connector. The electrical connector is coupled to the RF unit and the antenna module. The method also includes, during the calibration procedure, sampling the calibration RF signal to generate a sampled digitized signal. The method further includes, during the calibration procedure, communicating the sampled digitized signal as a first bitstream to the RF unit via the electrical connector to enable generation, at the RF unit, of a time delay associated with the electrical connector.

The features, functions, and advantages described herein can be achieved independently in various implementations or may be combined in yet other implementations, further details of which can be found with reference to the following description and drawings.

DETAILED DESCRIPTION

Figure 1:
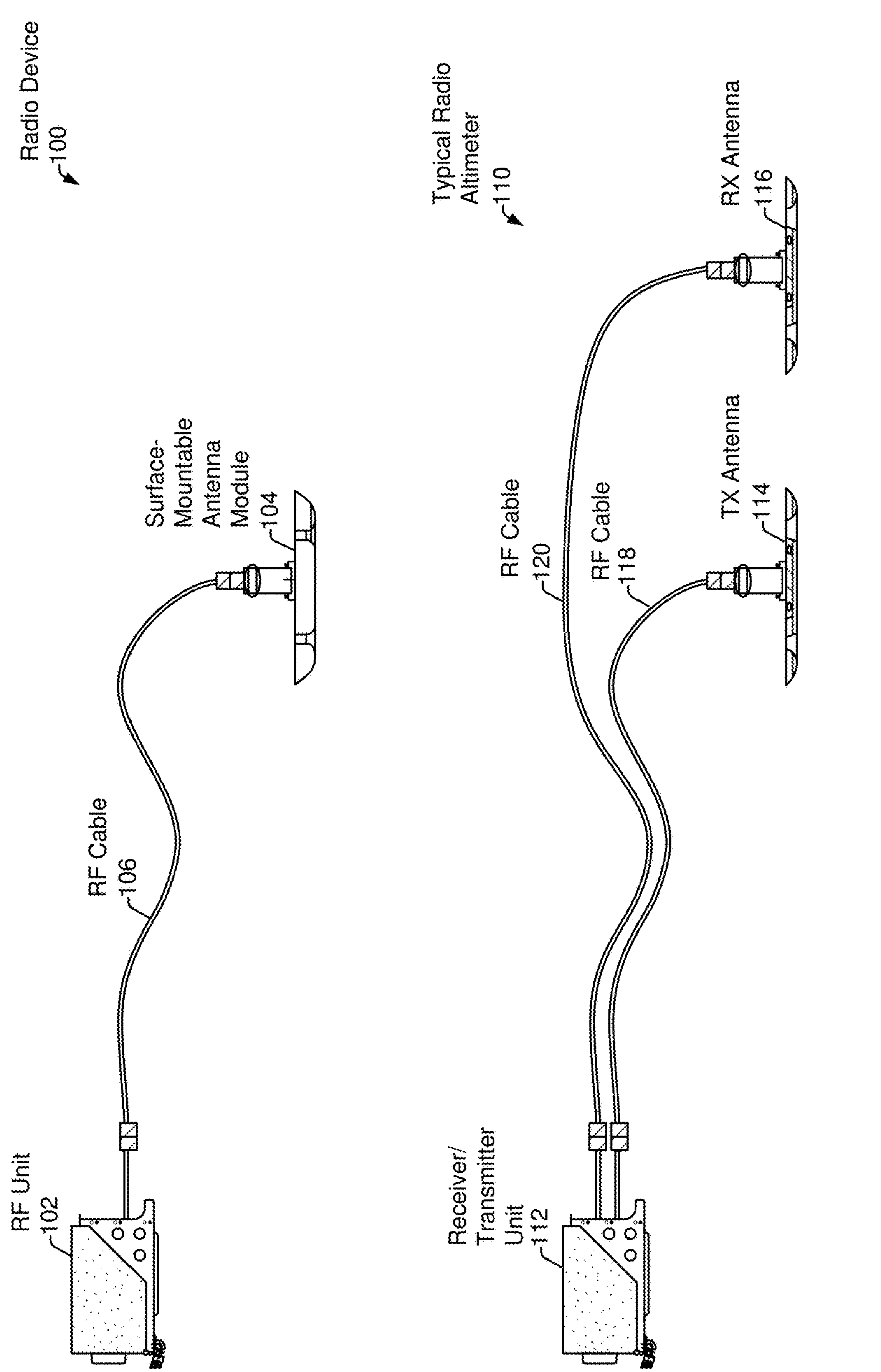
FIG. 1 is a diagram that illustrates an example of a radio device that combines radio altimeter and Doppler radar functionality and that includes a surface-mountable antenna array according to one or more aspects of the present disclosure.

Aspects disclosed herein present systems and methods for determining altitude, ground speed, and other measurements of a vehicle that do not rely on global positioning satellite (GPS) data, and in particular, systems and methods that leverage a radio device that combines radio altimeter and Doppler radar functionality and that includes a surface-mountable antenna array for use on vehicles, such as aircraft. The radio device supports a loop-back calibration process to account for delay associated with cabling between elements of the radio device. The radio device (e.g., a combined radio altimeter and Doppler radar) may be realized through a particular arrangement of digitization at the surface-mountable antenna array. The radio device of the present disclosure can be used to supplement location information from a GPS-based navigation system or other navigation system, such as an inertial navigation system (INS) or an inertial reference system (IRS), or to provide location-related information such as altitude and ground speed of a vehicle in situations in which the performance of the GPS-based navigation system is degraded or experiencing a GPS denied status. As used herein, a "GPS denied" status refers to a situation in which a GPS-based navigation system is not capable of determining an accurate location of the vehicle or, in the case of spoofing the GPS-based navigation system, that the GPS-based navigation system is outputting erroneous information without annunciation. The radio device of the present disclosure can operate as a multi-mode navigation radar by combining radio altimeter functionality and Doppler radar functionality to generate altitude measurement data, ground speed measurement data, or a combination thereof. It should be understood that either of the radio altimeter functionality or the Doppler radar functionality may be optional, such that the radio device described herein can be configured to provide radio altimeter functionality, Doppler radar functionality, or both functionalities.

Additionally, the radio device of the present disclosure can be more robust and less prone to failures than other types of radio altimeters due to distribution of various operations between a processing unit and circuitry included in the surface-mountable antenna array. The radio device (e.g., the combined multi-mode navigational radar) described herein can also have a substantially similar footprint (e.g., form factor) to currently-deployed radio altimeters, such that the currently-deployed radio altimeters can be replaced with the radio device of the present disclosure during vehicle retrofits that are relatively easy and inexpensive. Implementations of the radio device described herein can also be configured to use radio frequency (RF) waveforms and frequency ranges that are robust to interference from other wireless communication technologies, as well as being configured to reduce or prevent jamming and spoofing by malicious entities. Additionally, or alternatively, the radio device can be calibrated to account for delay associated with cabling that communicates signals between the processing unit and the circuitry included in the surface-mountable antenna array. Such implementations may reduce the amount of circuitry included in the surface-mountable antenna array.

In some implementations, a radio device includes an RF unit and a surface-mountable antenna module coupled to the RF unit by an RF cable. The surface-mountable antenna module includes an antenna array and circuitry configured to facilitate transmission and reception of RF signals via the antenna array. The circuitry is also configured to down-convert the RF signals to baseband and to generate digitized data of samples of the down-converted signal, serialized into a bit stream, that is communicated to the RF unit and that represents transmitted and received RF signals at the antenna array. The bit stream may represent digitized samples of in-phase and quadrature components of the RF signals, as further described herein. In some implementations, the surface-mountable antenna module comprises a single aperture radar with RF electronics (e.g., circuitry) to perform RF transmission, RF reception, and digitization at the antenna module. In such implementations, the surface-mountable antenna module is configured to communicate a serialized bit stream of digitized data via the RF cable to the RF unit, in contrast to conventional radio altimeters in which a receiver communicates received RF signals in an analog form via RF cables to an RF unit. Because the received RF signals are processed, digitized, and serialized at the surface-mountable antenna module, instead of being communicated to the RF unit for processing and digitization, leakage associated with RF cables and connectors does not affect the accuracy and integrity of measurements derived from the digitized data. Additionally, because digitization of the transmitted and received RF signals is performed at the surface-mountable antenna module, there is no requirement for the RF cable to be one of a set of predetermined lengths, which is a stringent requirement for conventional radio altimeters in which the length of the RF cable contributes to the difference in time between processing of an output RF signal and a return RF signal. As such, the radio device of the present disclosure can be deployed to a wider variety of vehicles and in a wider variety of positions along the surface of the vehicles due to the lack of cable length requirements, as compared to other radio altimeters in which RF cables are sized to a next largest predetermined size, which can require additional storage space in the aircraft to be used to store coiled up excess RF cables.

In some implementations, instead of providing a bitstream that includes digitized versions of output RF signals that are transmitted by the antenna module and return RF signals that are received at the antenna module, the antenna module can provide a bitstream that includes samples of a single digitized signal, either an RF output signal received from the RF unit or an RF return signal received via an antenna. Such an arrangement can enable a loop-back calibration process in which a calibration signal received from the RF unit is sampled and digitized by the antenna module and provided back to the RF unit as a bitstream. The RF unit can compare the originally sent calibration signal to the bitstream received from the antenna unit to identify a delay associated with signal propagation through cabling between the RF unit and the antenna module. The RF unit can then subtract this delay from calculations of height or speed during a measurement phase in order to account for the delay caused by the cable, which may allow any length of cable to be used instead of a fixed number of predetermined cable lengths. This loop-back calibration process can be repeated several times when the radio device is powered on, or periodically during operation, to account for delay caused by the cable, as well as changes in the environment such as changes in temperature, pressure, altitude, or the like, that can affect signal delay associated with the cable. Because only a single signal is represented by the bitstream, the circuitry of the antenna module can include a single analog-to-digital converter (ADC) and related circuitry, as compared to using two in order to provide samples of both the received RF output signal and the return RF signal. Additionally, because the loop-back calibration process does not include transmission via the antenna, the waveform of the calibration signal can be designed to better fit the process instead of being based on factors associated with the antenna, such as having a larger bandwidth, a different frequency, multiple frequencies or the like. The calibration signal can be optimized to perform precise measurement of the cable length. Other characteristics of the cable could be measured with the same loop-back technique, such as Voltage Standing Wave Ration (VSWR) or insertion loss. The other characteristics or measurements could be useful for maintenance/fault monitoring for the device.

Additionally, or alternatively, to improve processing time of the loop-back calibration process and the measurement process, the RF unit can store a representation of the digitized RF output signal (or calibration signal) or information derived therefrom, such as fast Fourier transform FFT samples of the digitized RF output signal (or calibration signal) at a memory to be used to compare to similar values based on the bitstream received from the antenna module. Storing these values in the memory enables the RF unit to calculate the values a single time, during generation of the RF output signal (or calibration signal) at the RF unit, instead of also upon receipt of a digitized version of the signal from the antenna module, which can reduce processing time and processing resource usage associated with performing the loop-back calibration process or the measurement process.

In some implementations, the antenna array of the radio device, in combination with the additional circuitry, is designed and sized to fit the form factor of existing radio altimeters. As a particular example, a mounting hole arrangement for the antenna array may match mounting hole arrangements of existing radio altimeters. Such design and sizing enables retrofitting aircraft to replace existing radio altimeters with the radio device of the present disclosure without the added cost or complexity of having to mount larger equipment or change a relative position of the radio device, which can also require additional wiring or other modifications to enable installation of the radio device. In some implementations, the radio device of the present disclosure is configured to perform radar functions in a particular frequency band, such as the 13.25 gigahertz (GHz) to 13.4 GHz band, that is selected to reduce interference from other wireless communication technologies and to operate in a frequency band that is designated worldwide for aeronautical Doppler radar operations, thereby improving the robustness of the radio device. Additionally, or alternatively, the antenna array can be configured to perform beamforming to enable transmission and reception of RF waveforms for altitude measurements and Doppler radar-based speed measurements in various directions from the antenna array. In some such implementations, the beamforming is passive beamforming performed using a preconfigured beamforming network, such as a two-dimensional Butler Matrix as a non-limiting example. In some other implementations, the beamforming is active beamforming performed using an adaptive beamforming network.

Additionally, or alternatively, the radio device can be configured to perform wireless transmission and reception of information using RF waveforms and codes that are designed to improve performance and to reduce or eliminate spoofing by malicious entities. For example, the radio device can be configured to use orthogonal frequency division multiplexing (OFDM) waveforms or direct sequence spread spectrum (DSSS) waveforms which have long sequences of pseudo-random noise and, assuming no communication bits are included, low post-correlation bandwidth, thus enabling high processing gain and reduced susceptibility to interference from other types of wireless communications. As another example, the radar waveforms used to perform the altimeter and Doppler-based measurement functionality can be generated pseudo-randomly, such that the antenna array module can authenticate return RF signals by comparing received messages to the transmitted messages to authenticate the return RF signals. Return RF signals that are successfully authenticated can be processed, and return RF signals that fail authentication can be discarded, thereby preventing spoofing or fraudulent signals from being used to generate measurements without requiring the complexity of cryptographic coding of the messages and associated key management.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, a system may be described herein as including one or more computing devices ("computing device(s)"), which indicates that in some implementations the system includes a single computing device and in other implementations the system includes multiple computing devices. For ease of reference herein, such features are generally introduced as "one or more" features, and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a radio device 100 that includes a surface-mountable antenna array according to one or more aspects of the present disclosure. The radio device 100 may operate as a combined radio altimeter and Doppler radar that provides radio altimeter functionality, Doppler radar functionality, or both functionalities, as further described below. In some implementations, the radio device 100 is configured to support a loop-back calibration procedure, as further described herein with reference to FIG. 9. For comparison, FIG. 1 also depicts a typical radio altimeter 110 that conforms to a popular form, fit, and function standard.

The radio device 100 is configured to output measurement data, such as altitude data, position data, ground speed data, or a combination thereof, for use by a navigation system of a vehicle. In some implementations, the radio device 100 can be configured to output ground speed measurement data to an inertial navigation system (INS) or an inertial reference system (IRS) of an aircraft, as further described herein. The radio device 100 includes a radio frequency (RF) unit 102, a surface-mountable antenna module 104, and an RF cable 106.

The RF unit 102 and the surface-mountable antenna module 104 are interconnected via the RF cable 106 to enable digital signal communication between the RF unit 102 and the surface-mountable antenna module 104. The RF unit 102 and the surface-mountable antenna module 104 can be positionally distributed from each other with respect to a vehicle. For example, the RF unit 102 can be located in, or adjacent to, a cabin, cockpit, or electronics bay of a vehicle, such as an aircraft, and the surface-mountable antenna module 104 can be mountable to a bottom surface of the aircraft (e.g., a bottom surface with reference to a typical orientation of the aircraft during normal flight, such that the bottom surface is closest to ground during a substantial portion of the flight), as further described herein with reference to FIG. 5. Although described as being mountable on the bottom surface of the aircraft, in other implementations, the surface-mountable antenna module 104 can be mountable on any surface of the aircraft based on available surface real estate, performance of the antenna, other considerations, or a combination thereof. As such, the RF cable 106 can have any arbitrary length that is selected to provide sufficient cable to couple the RF unit 102 and the surface-mountable antenna module 104 based on the respective positions, and not any particular predetermined length or size. For example, the length of the RF cable 106 is not required to be one of a set of preconfigured cable lengths, such as 40, 57, or 80 feet as is common to comply with an Aeronautical Radio, Inc. (ARINC) 707 standard, and instead the length of the RF cable 106 can be selected based on the distance between the RF unit 102 and the surface-mountable antenna module 104 and available cable routing paths therebetween. ("ARINC" is a registered trademark of ARINC Incorporated of Annapolis, Maryland). In some implementations, different types of aircraft (or other vehicles) can have different distances between the respective RF unit 102 and the respective surface-mountable antenna module 104, and thus the RF cable 106 of different types of aircraft can have different respective lengths. In some implementations, the RF cable 106 includes or corresponds to RF coaxial cable that is compliant with an ARINC 707 standard (e.g., is ARINC 707 compliant) or with another aeronautical technical standard.

The RF unit 102 includes a processor, such as a digital signal processor (DSP), Field Programmable Gate Array (FPGA), an application-specific integrated circuit (ASIC), Graphics Processing Unit (GPU) or other computing device which can be coupled to a memory, a transmitter, and a receiver, and in combination these components can be configured to enable performance of the operations described herein with reference to the RF unit 102. Because the RF unit 102 is configured to manage input and output signals to the surface-mountable antenna module 104 and to perform computations to generate measurement data, the RF unit 102 can also be referred to as a computation and input/output (I/O) unit. Although described as including a processor or a DSP, in other implementations, one or more operations described as being performed by the RF unit 102 can be implemented using another type of processor, dedicated hardware, firmware, or a combination thereof. Such hardware can include an ASIC, a FPGA or a GPU as illustrative examples. In some implementations, the memory includes a computer-readable medium that stores instructions that are executable by the processor (e.g., the DSP). The instructions are executable to initiate, perform or control operations to aid in deserialization of a bit stream that represents RF signals from the surface-mountable antenna module 104 and generation of measurement data based on the deserialized data. In some implementations, the RF unit 102 includes additional circuitry configured to support performance of the operations described herein. The additional circuitry can include a digital-to-analog converter, a power amplifier, a diplexer, a demodulator, a deserializer, other circuitry, or a combination thereof, as further described with reference to FIG. 2. In some implementations, the RF unit 102 can include or correspond to a line replaceable unit (LRU) of the aircraft. As such, the RF unit 102 can be a fully functional modular unit that is designed to be replaced during field-level or intermediate-level maintenance of the aircraft. The RF unit 102 can also include an electrical connector configured to be coupled to the receiver and to the RF cable 106. In some implementations, the electrical connector includes or corresponds to a coaxial cable connector. Additionally, or alternatively, the electrical connector can be ARINC 707 compliant.

The surface-mountable antenna module 104 includes a housing that is configured to be coupled to a surface of a vehicle, such as an aircraft. For example, the housing can include an outer surface or one or more walls that enclose other components of the surface-mountable antenna module 104 and that is configured to be coupled to the surface of the vehicle, such as via screws or other fasteners. In some implementations, the housing can include or encompass a hermetically sealed compartment, as further described herein. In some implementations, the housing can be coupled to a bottom surface of an aircraft, such that the surface-mountable antenna module 104 is mountable on the underside of the aircraft, with respect to the orientation of the aircraft during a substantial portion of flight. Although some examples disclosed herein are described in the context of an aircraft, the present disclosure is not so limited, and the radio device 100 can be mountable on the surface of other vehicles according to other aspects of this disclosure.

Within the housing, the surface-mountable antenna module 104 includes a receiver, an optional transmitter (or transmitter stage), an antenna, circuitry, and at least a portion of an electrical connector. The receiver can be configured to receive an output RF signal from the transmitter of the RF unit 102. The antenna can be configured to transmit the output RF signal and to receive a return RF signal based on the output RF signal, such as during a process to generate altitude measurement data by the radio device 100. In some implementations, the antenna includes or corresponds to an antenna array, such as a 9×8 antenna array or a 14×13 antenna array, as non-limiting examples. The antenna array can be configured to support beamforming, as further described herein. The circuitry can be coupled to the receiver and the transmitter to enable communication of data that represents digitized RF signals between the surface-mountable antenna module 104 and the RF unit 102. For example, the circuitry can be configured to generate a digitized output RF signal and a digitized return RF signal based on the output RF signal and the return RF signal, respectively. The transmitter can be configured to transmit, via the electrical connector and the RF cable 106, bit streams representative of the digitized RF signals, as further described herein. The electrical connector is coupled to the receiver and to the RF cable 106. In some implementations, the electrical connector includes or corresponds to a coaxial cable connector. Additionally, or alternatively, the electrical connector can be ARINC 707 compliant. Because the RF signals are digitized at the circuitry of the surface-mountable antenna module 104, and thus the RF cable 106 communicates digitized data as bit streams, the RF cable 106 can have a length that is substantially equal to the distance between the RF unit 102 and the surface-mountable antenna module 104, and the measurement data derived from the bit streams received at the RF unit 102 is not dependent on the length of the RF cable 106. Stated another way, the RF cable 106 is not constrained to have a length within a set of predetermined lengths or the surface-mountable antenna module 104 is agnostic as to a length of the RF cable 106. In some implementations, a loop-back calibration procedure can be performed to account for delay introduced by the RF cable 106, as further described herein with reference to FIG. 9.

The typical radio altimeter 110 includes a receiver/transmitter unit 112, a transmit antenna 114, a receive antenna 116, a first RF cable 118 that couples the receiver/transmitter unit 112 to the transmit antenna 114, and a second RF cable 120 that couples the receiver/transmitter unit 112 to the receive antenna 116. The receiver/transmitter unit 112 is configured to generate an output RF signal for transmission by the transmit antenna 114 and to perform RF processing and demodulation on a return RF signal received by the receive antenna 116, in addition to digital signal processing associated with analyzing the signals to generate altitude measurements. Because the digital signal processing and demodulation are performed by the receiver/transmitter unit 112, the first RF cable 118 and the second RF cable 120 are configured to communicate RF signals between the receiver/transmitter unit 112 and the respective antenna, as compared to communicating a digitized bit stream such as the bit stream communicated by the RF cable 106. For this reason, the length of the RF cables 118, 120 affects the RF signals being communicated, and thus the receiver/transmitter unit 112 is configured to perform calculations to compensate for the effect of the RF cables 118, 120 when processing the RF signals. To reduce the complexity of the compensation calculations, the length of the RF cables 118, 120 are constrained to a set of predetermined lengths, in some examples 40 feet, 57 feet, or 80 feet, such that computations can be limited by one of three values. To provide the receiver/transmitter unit 112 with knowledge of the length of each of the RF cables 118, 120, an indicator on the respective cable connectors can be configured to indicate a length of 40 feet, 57 feet, or 80 feet, such as by placing a jumper on one of three corresponding pins on the connector, or in a similar manner. If the distance between the receiver/transmitter unit 112 and the antennas 114, 116 is between any of the preconfigured lengths, the remaining cabling is spooled, coiled, or otherwise stored in the aircraft, using space that could otherwise be used to store other components or serve other purposes. Additionally, each RF connector (e.g., at the transmit antenna and the receive antenna 116) represents a potential failure mode that can impact measurement integrity or accuracy of altitude measurements generated by the receiver/transmitter unit 112. For example, signal leakage at an RF connector on the transmit signal path (e.g., from the transmit antenna 114 to the receiver/transmitter unit 112) can result in energy coupling into the receive antenna 116, leading to an inaccurate altitude reading.

In contrast to the typical radio altimeter 110, the radio device 100 includes a single aperture antenna (e.g., the surface-mountable antenna module) instead of two antennas. In some implementations in which the radio device 100 is retrofitted in place of the typical radio altimeter 110, a plate may act as a cap or covering for an opening that previously housed a second antenna prior to the retrofit. Removing an antenna and operating only a single antenna (e.g., the surface-mountable antenna module 104) and connecting cable can reduce the overall weight of the system as compared to operating the two antennas 114, 116 of the typical radio altimeter 110.

During operation of the radio device 100, the RF unit 102 can generate an output RF signal for use in performing measurements associated with the aircraft. In some examples, the output RF signal is used to perform an altitude measurement, and thus can be referred to as an altitude signal. In some other examples, the output RF signal can be used to perform a Doppler-based speed measurement, and thus can be referred to as a Doppler signal. In some implementations, the RF unit 102 can generate the output RF signal based on a status of another type of navigation system of the aircraft. For example, the RF unit 102 can generate one or more types of output RF signal based on current availability and/or performance of a GPS-based navigation system or module including, for example, experiencing a global positioning system denied ("GPS-denied") status, which can occur due to lack of clear line of sight to a sufficient number of GPS satellites, unintended interference from other wireless communication technologies being operated in the vicinity of the aircraft, or due to jamming or spoofing of the GPS signals by a malicious entity.

In some implementations, the output RF signal is associated with an output RF waveform having a frequency in a range from approximately 13.25 GHz to approximately 13.4 GHz, which is a particular frequency band that is designated for use by the Earth Exploration-Satellite Service (EESS), the Aeronautical Radionavigation Service (ARNS), and the Space Research Service (SRS) by the International Telecommunications Union (ITU). In such implementations, transmission and/or reception of waveforms in this frequency band are reserved for a subset of services, and thus are less likely to experience interference from other wireless communications technologies, such as 5G or other current or future cellular communications technologies. In other implementations, the output RF signal can have a frequency that is in a different frequency band, such as a frequency band selected based on allocations in other countries or according to other organizations.

Additionally, or alternatively, the output RF signal can be associated with an orthogonal frequency division multiplexing (OFDM) modulation scheme, such that the data to be transmitted using the output RF signal is multiplexed on multiple closely spaced orthogonal subcarriers. Employing an OFDM modulation scheme for the output RF signal can improve the quality of range and resolution of the radar, particularly in poor channel conditions, due to the improved signal-to-noise ratio and cross correlation properties offered by OFDM modulation. Additionally, or alternatively, the output RF signal can be associated with a Direct Sequence Spread Spectrum (DSSS) modulation scheme, such that a carrier to be transmitted using the output RF signal may be modulated by a pseudo-random bit stream or code that causes the spectrum of the transmission to be spread. DSSS modulation schemes also offer signal-to-noise benefits through processing gain and have excellent cross correlation properties, thus allowing measurement of range and relative Doppler of the return signal. In other implementations, the output RF signal can be associated with other types of modulation or coding schemes. In some implementations, each RF waveform may be associated with an individual respective modulation scheme, such that some RF waveforms are associated with OFDM modulation schemes and others are associated with DSSS modulation schemes. The waveforms may be randomly selected from a preset family of waveforms that are generated and modulated to prevent or reduce the likelihood of spoofing.

The RF unit 102 can communicate the output RF signal to the surface-mountable antenna module 104 via the RF cable 106. The surface-mountable antenna module 104 can cause the output RF signal to be transmitted via the antenna. The output RF signal can be transmitted as an output RF waveform as part of a radio altimeter and/or Doppler radar operation. In some implementations, transmission of the output RF signal can include beamforming the output RF signal, as further described with reference to FIGS. 2-5. For example, the RF unit 102 can generate a beamforming control signal that includes data indicative of a selected beamforming pattern, a beamforming sequence location, or a combination thereof, and the RF unit 102 can communicate the beamforming control signal to the surface-mountable antenna module 104. The surface-mountable antenna module 104 can receive the beamforming control signal and perform the beamforming according to the selected beamforming pattern, the beamforming sequence location, or a combination thereof. The beamforming performed by the surface-mountable antenna module 104 can include passive beamforming or active beamforming (e.g., the beamforming pattern can include or correspond to a preconfigured beamforming network configuration or an active beamforming network configuration), as further described herein.

In response to transmission of the output RF signal, the antenna of the surface-mountable antenna module 104 can receive a return RF signal. For example, the return RF signal can be a reflection of the output RF signal that is returned by the ground below the aircraft during flight. The surface-mountable antenna module 104 can process the return RF signal to generate a digitized return RF signal. In some implementations, the surface-mountable antenna module 104 also processes the transmitted RF output signal to generate a digitized output RF signal. In such implementations, the surface-mountable antenna module 104 can digitize and serialize the digitized output RF signal and the digitized return RF signal to generate a serialized baseband signal, and the surface-mountable antenna module 104 can communicate the serialized baseband signal as a bit stream to the RF unit 102 via the RF cable 106.

In some implementations, serializing the digitized RF signals can include modulating the digitized RF bit stream onto a different frequency than the output RF signal to generate a modulated signal whose data content represents a serialized, sampled base-band representation of the RF signal that is communicated to the RF unit 102. To illustrate, the surface-mountable antenna module 104 can down-convert the output RF signal and the return RF signal to baseband, and the down-converted signals can be sampled at a rate that is sufficient to cover the working frequency of the RF signals in order to generate digitized samples of the output RF signal and the return RF signal that represent the in-phase and quadrature (I and Q) components of the RF signals. As a non-limiting example, if the working frequency of the RF signals is within the range of approximately 13.25 GHz to 13.4 GHz, the sampling rate is approximately 150 mega samples per second (MS/s) or greater to capture the entire 150 MHz working bandwidth. In some examples, these digitized samples of the in-phase and quadrature components are serialized as the bit stream that is provided to the RF unit 102 by the surface-mountable antenna module 104. In some alternate implementations, the surface-mountable antenna module 104 digitizes the return RF signal and provides only the return RF signal as the modulated bitstream. Digitizing the transmit RF signal is omitted due to performance of a calibration procedure, such that the digitized output RF signal is not used for the delay measurement. Such a calibration procedure is further described herein with reference to FIG. 9.

The RF unit 102 can demodulate the serialized bit stream and deserialize the digitized signals to extract the digitized baseband return signal, and optionally the digitized baseband output signal, for use in calculating altitude measurements of the aircraft or Doppler measurements for determining speed measurements of the aircraft. To illustrate, the RF unit 102 can receive the bit stream from the surface-mountable antenna module 104 and analyze the bit stream to extract data representing the output RF signal associated with the output RF waveform prior to transmission at the antenna and data representing the return RF signal received by the antenna based on transmission of the output RF signal. Alternatively, the digitized base-band representation of the output RF signal may be stored at the RF unit 102 during or before generation of the signal for later comparison to the return RF signal. The RF unit 102 can analyze this data to generate an altitude indication for the aircraft by measuring the delay between the transmitted and received signals. For example, the RF unit 102 can calculate a difference in time based on a cross-correlation associated with the output RF signal and the return RF signal in order to estimate the time delay between the transmitted and received signals which, when multiplied by the speed of light divided by two, yields an altitude measurement for the aircraft. In a similar manner, the digitized output RF signal and the digitized return RF signal can be compared to determine a relative Doppler shift between the output RF signal and the return RF signal. The relative Doppler shift is a function of the speed of the vehicle over the ground, referred to as the ground speed of the vehicle.

As another example, the RF unit 102 can deserialize the bit stream to extract the data representing the return RF signal, and optionally the data representing the output RF signal (or in other implementations the data can be retrieved from memory), to compare the two data for generating an RF output discrepancy metric. If the output discrepancy metric exceeds an RF output discrepancy threshold, the RF unit 102 can generate an RF output discrepancy indication that indicates that there is a potential error condition associated with the altimeter measurements. Additionally, if the radio device 100 is configured to perform Doppler-based measurements, the RF unit 102 can analyze additional values of the bit stream to generate a speed indication for the aircraft, as further described herein with reference to FIG. 5. The RF unit 102 can provide the indicators and/or the measurement data (e.g., the altitude measurement data or the speed measurement data) to an INS or IRS for use in location determination and navigation in situations in which a GPS-based navigation system is experiencing a GPS-denied status, or to supplement measurements derived from GPS data.

Additionally, or alternatively, the RF unit 102 can provide the measurement data, information derived from the measurement data, the altitude indication, the speed indication, or a combination thereof, to one or more visual displays of the aircraft. As an example, the radio device 100 can be coupled to a navigational display that is configured to display an altitude reading and/or a ground speed based on the bit stream received by the RF unit 102 from the surface-mountable antenna module 104. In some examples, the return RF signal is a reflection of the output RF signal from the ground that is received by the antenna, and the altitude reading can be calculated based on a time difference between the digitized output RF signal and the digitized return RF signal. The altitude reading can be displayed by the navigational display or a different altitude indicator. Additionally, or alternatively, the altitude reading can be provided to a variety of other aircraft systems including, but not limited to, an automatic flight control system, a ground proximity warning system, a braking control system, a flight management system, an inertial system, and GPS receiver(s) on the aircraft.

As another example, the radio device 100 can be coupled to a ground speed indicator, such as the navigational display, that is configured to display a ground speed of the aircraft based on the bit stream received by the RF unit 102 from the surface-mountable antenna module 104. In this example, multiple Doppler radar signals can be transmitted as output RF signals (such as a port front beam/signal, a starboard front beam/signal, a port back beam/signal, and a starboard back beam/signal) by the antenna of the surface-mountable antenna module 104, and the respective reflections of the output RF signals can be received as returned RF signals by the antenna of the surface-mountable antenna module 104. The beam/signal arrangement discussed here is an example, and in other implementations, other beam/signal configurations are possible such as, for example, a configuration with a forward beam/signal, a right beam/signal, a rear beam/signal, and a left beam/signal. The Doppler shift (e.g., the change in frequency) caused by the Doppler effect can be calculated based on a comparison of the frequency of the digitized output RF signals and the digitized return RF signals, and the ground speed of the aircraft can be calculated based on the observed Doppler shift taking into account the geometry of the antenna beams for use in displaying the ground speed, such as via the navigational display or a different ground speed indicator. Additionally, or alternatively, the ground speed can be provided to a variety of other aircraft systems including, but not limited to, an automatic flight control system, a ground proximity warning system, a braking control system, a flight management system, an inertial system, and GPS receiver(s) on the aircraft, similar to as described above for the altitude reading.

In this manner, the RF unit 102 can be designated to generate output signals for the surface-mountable antenna module 104 in addition to demodulating and deserializing received bit streams from the surface-mountable antenna module 104 to generate measurement data, and the surface-mountable antenna module 104 can be designated to perform RF processing, beamforming, and analog-to-digital (A/D) conversion of RF signals. By locating the RF processing and A/D conversion at the surface-mountable antenna module 104, the radio device 100 enables digitization of the RF signals at the surface-mountable antenna module 104 instead of at the RF unit 102, as compared to the typical radio altimeter 110. Because both the transmit and receive signals are already digitized before being communicated via the RF cable 106, the length of the RF cable 106 does not change the relative delay/Doppler of the signals and therefore does not affect the calculations performed to generate the measurement data, and thus the length of the RF cable 106 does not affect the accuracy or integrity of the measurements. To illustrate, a digitized version of the output RF signal may be provided to the RF unit 102 by the surface-mountable antenna module 104 (which accounts for any delay in the RF cable 106) or a calibration procedure can be performed, as further described with reference to FIG. 9, to account for any delay associated with the RF cable 106. In some implementations that include performance of the calibration procedure, the amount of circuitry at the surface-mountable antenna module 104 can be reduced. Additionally, or alternatively, the RF unit 102 may include a memory to store digitized representations of RF output signals, or values derived therefrom, for comparison with the return RF signal received from the surface-mountable antenna module 104, which can increase the speed of the measuring or calibration process and reduce processing resource usage, as further described herein with reference to FIG. 9.

In addition, confidence in the readings of the radio device 100 is improved as compared to readings of the typical radio altimeter 110. To illustrate, because received RF signals are processed and digitized in the receiver/transmitter unit 112 of the typical radio altimeter 110, leakage from connectors between the receiver/transmitter unit 112 and the RF cables 118, 120 or connectors between the antennas 114, 116 and the RF cables 118, 120 can cause loss of RF signals, resulting in potential inaccuracy of measurements generated by the typical radio altimeter 110. Unlike the typical radio altimeter 110, the radio device 100 of the present disclosure digitizes RF signals at the surface-mountable antenna module 104, such that leakage in RF connectors cannot cause inaccuracies in the measurements generated by the radio device 100, thereby improving confidence in the altitude and ground speed readings from the radio device 100. Additionally, periodic performance of the calibration procedure can increase confidence that changes to conditions that can influence delay associated with the RF cable 106 are accounted for, and if a failure condition is introduced by the RF cable 106, the performance of the calibration procedure is likely to detect the condition. Additionally, the calibration procedure can be expanded to include specific tests designed to detect faults in the RF cable 106 or the connectors. For example, a Time Domain Reflectometer (TDR) test can be implemented to detect crimped cables or broken connectors.

Additionally, because the processing of the signals is agnostic to the length of the RF cable 106, the length of the RF cable 106 is not constrained to be one of a set of predetermined lengths. This increases the locations on the surface of the aircraft that the surface-mountable antenna module 104 can be mounted, which increases the utility of the surface-mountable antenna module 104 with respect to use on different models of aircraft. Also, the length of the RF cable 106 can be selected based on the distance between the RF unit 102 and the surface-mountable antenna module 104 without having to account for excess cable if the distance is less than the closest predetermined length from a set of fixed lengths, which eliminates the storage area needed to spool or coil overly long portions of RF cables as compared to aircraft which use the typical radio altimeter 110.

Additionally, the surface-mountable antenna module 104 can be designed to have the same form factor as the transmit antenna 114 (or the receive antenna 116) of a conventional system, such as one that conforms to the ARINC 707 standard, thereby lowering the cost and complexity of replacing the typical radio altimeter 110 with the radio device 100 during a retrofit, such as an overnight retrofit. Additionally, as further described herein, the surface-mountable antenna module 104 can include an antenna array and beamformer that enables performance of both altitude measurements and Doppler-based speed measurements using a single component, and the antenna array can be configured to transmit OFDM-modulated RF waveforms, DSSS-modulated RF waveforms, or a combination thereof, with pseudo-random noise at particular frequencies to reduce interference from other wireless communication technologies, to make use of dedicated frequency resources for aircraft navigation (such as those allocated to the ARNS), and to reduce or eliminate the possibility of the RF waveforms transmitted by the radio device 100 being jammed or spoofed by malicious entities.

Figure 2:
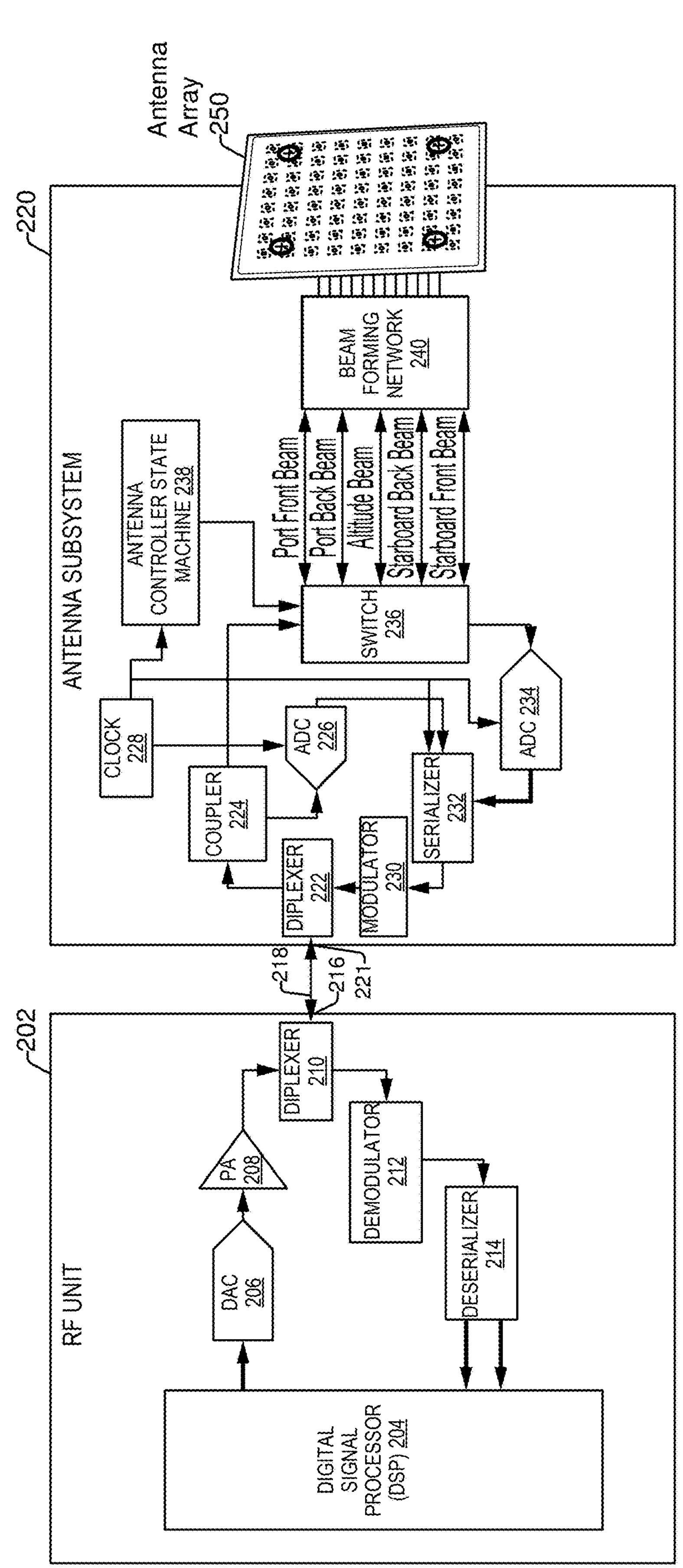
FIG. 2 is a block diagram of a particular implementation of a radio device that combines radio altimeter and Doppler radar functionality and that includes a surface-mountable antenna module according to one or more aspects of the present disclosure.

FIG. 2 depicts a particular implementation of a radio device 200 that combines radio altimeter and Doppler radar functionality and that includes a surface-mountable antenna module according to one or more aspects of the present disclosure. In some implementations, the radio device 200 of FIG. 2 can include or correspond to the radio device 100 of FIG. 1. In the implementation shown in FIG. 2, the radio device 200 includes an RF unit 202 coupled to an antenna subsystem 220 by an RF cable 218. In some implementations, the RF unit 202 includes or corresponds to an LRU or another component inside of a vehicle (e.g., an aircraft), the RF cable 218 is a coaxial cable that is ARINC 707 compliant, and the antenna subsystem includes 220 or corresponds to components within a housing that is mounted to a surface, such as a bottom surface, of the aircraft in a different location than the RF unit 202.

The RF unit 202 includes a digital signal processor (DSP) 204, a digital-to-analog converter (DAC) 206, a power amplifier (PA) 208, a diplexer 210, a demodulator 212, a deserializer 214, and a first electrical connector 216. The DSP 204 is coupled to the DAC 206 and the deserializer 214. The DAC 206 is coupled to the DSP 204 and the PA 208. The PA 208 is coupled to the DAC 206 and the diplexer 210. The diplexer 210 is coupled to the PA 208, the first electrical connector 216, and the demodulator 212. The demodulator 212 is coupled to the diplexer 210 and the deserializer 214. The deserializer 214 is coupled to the demodulator 212 and the DSP 204. The antenna subsystem 220 (e.g., a surface-mountable antenna module) includes a second electrical connector 221, a diplexer 222, a directional coupler 224, an analog-to-digital converter (ADC) 226, a clock 228, a modulator 230, a serializer 232, an ADC 234, a switch 236, an antenna controller state machine 238, a beam forming network 240, and an antenna array 250. Although described as a state machine, in other implementations, the antenna controller state machine 238 may be a generalized processor or controller of any type, such as a microprocessor or microcontroller, as non-limiting examples. The diplexer 222 is coupled to the second electrical connector 221, the directional coupler 224, and the modulator 230. The directional coupler 224 is coupled to the diplexer 222, the ADC 226, and the switch 236. The ADC 226 is coupled to the clock 228, the serializer 232, and the directional coupler 224. The clock 228 is coupled to the ADC 226, the ADC 234, the serializer 232, and the antenna controller state machine 238. The serializer 232 is coupled to the modulator 230, the ADC 234, the ADC 226, and the clock 228. The ADC 234 is coupled to the clock 228, the switch 236, and the serializer 232. The switch 236 is coupled to the directional coupler 224, the ADC 234, and the antenna controller state machine 238. The beamforming network 240 coupled to the switch 236 and the antenna array 250.

The first electrical connector 216 can be coupled to the second electrical connector 221 via the RF cable 218. In some implementations, the first electrical connector 216 and the second electrical connector 221 are coaxial connectors. Additionally, or alternatively, the first electrical connector 216 can be configured to receive power for the DAC 206, the PA 208, the demodulator 212, the deserializer 214, or a combination thereof, and the second electrical connector 221 can be configured to receive power for the ADC 226, the ADC 234, the serializer 232, the modulator 230, the antenna controller state machine 238, the switch 236, the beamforming network 240, or a combination thereof.

Although FIG. 2 illustrates the RF unit 202 and the antenna subsystem 220 as including particular individual components, in other implementations the described functionality of two or more of the components of the RF unit 202 or the antenna subsystem 220 can be performed by a single component. For example, the ADC 226 and the ADC 234 can be replaced with a single ADC, and the switch 236 can be replaced with a hybrid switch that is capable of providing a signal to the beamforming network 240 as output or to the ADC as output (i.e., to pass the output RF signal for digitization) as well as receiving a signal from the beamforming network 240 and providing the signal as output to the ADC. Additionally, or alternatively, at least some of the DSP 204, the DAC 206, the PA 208, the diplexer 210, the demodulator 212, the deserializer 214, the diplexer 222, the directional coupler 224, the ADC 226, the clock 228, the modulator 230, the serializer 232, the ADC 234, the switch 236, the antenna controller state machine 238, and the beamforming network 240 can be represented in hardware, such as via an application-specific integrated circuit (ASIC) or a field-programmable gate array (FPGA), or the operations described with reference to some of the elements can be performed by a processor executing computer-readable instructions. For brevity, any combination of the DAC 206, the PA 208, the diplexer 210, the demodulator 212, the deserializer 214, the diplexer 222, the directional coupler 224, the ADC 226, the clock 228, the modulator 230, the serializer 232, the ADC 234, the switch 236, the antenna controller state machine 238, and the beamforming network 240 can be referred to herein as circuitry.

During operation of the radio device 200, the RF unit 202 can be configured to generate output RF signals for transmission as output RF waveforms by the antenna array 250 under control of the antenna subsystem 220, and to receive digitized representations of RF signals from the antenna subsystem 220 for processing to generate altitude indicators, altitude measurements, speed indicators, speed measurements, other measurements or indicators, or a combination thereof. To illustrate, the DSP 204 can be configured to generate an output signal (e.g., a transmit (TX) signal) for transmission by the antenna subsystem 220. In some implementations, the DSP 204 generates the output signal based on a condition of the vehicle, such as a GPS-denied condition, an automatic or manual request, an uncertainty rating associated with a GPS-based navigation system falling below a threshold, or some other trigger condition. The DAC 206 can be configured to perform digital-to-analog conversion on the output signal (e.g., a digitized signal) to generate an output RF signal (e.g., an analog signal) that can be amplified by the PA 208 and passed through the diplexer 210 to the first electrical connector 216 for communication to the antenna subsystem 220 via the RF cable 218.

The second electrical connector 221 can be configured to receive the output RF signal and to provide the output RF signal to the diplexer 222 for passing to the directional coupler 224. The ADC 226 can generate a digitized RF signal representing the output RF signal using a clock signal from the clock 228, and the digitized RF signal can be provided to the serializer 232. The directional coupler 224 can also provide the output RF signal to the switch 236, and the switch 236 can be configured to manage inputs and outputs from the beamforming network 240 based on one or more control signals from the antenna controller state machine 238. The antenna controller state machine 238 can be configured to determine a state of the antenna subsystem 220 based on a clock signal from the clock 228, the previous state, and a state diagram or configuration, and each operating state can be associated with the output of various control signals to the switch 236. For example, the antenna controller state machine 238 can be configured to determine a beam (e.g., based on a selected RF signal) of a plurality of beams to be output by the beamforming network 240.

For example, the antenna controller state machine 238 can determine whether a current state is an altitude transmit state, one or more Doppler transmit states, an altitude receive state, one or more Doppler receive states, other states, or a combination thereof, and based on the current state, the antenna controller state machine 238 can provide appropriate control signaling to the switch 236 to facilitate operations associated with the current state. As an example, if the antenna controller state machine 238 determines that the current state is an altitude transmit state, the antenna controller state machine 238 can provide control signaling to the switch 236 to cause the switch 236 to provide the output RF signal to the beamforming network 240 as an altitude transmit beam input. As another example, if the antenna controller state machine 238 determines that the current state is a Doppler transmit state (e.g., one of multiple Doppler transmit states), the antenna controller state machine 238 can provide control signaling to the switch 236 to cause the switch 236 to provide the output signal as a particular Doppler transmit beam.

The Doppler transmit beam can depend on the configuration of the antenna array 250. In some implementations, the antenna array 250 can be configured to transmit four different beams for performing Doppler-based measurements with respect to a relative location of the aircraft: a port front beam, a port back beam, a starboard back beam, and a starboard front beam, as further described with reference to FIG. 5. In other implementations, the antenna array 250 can be configured to transmit more than four or fewer than four beams for performing Doppler-based measurements, and the beams can be located in other relative positions of the antenna array 250 or have other configurations.

Figure 4:
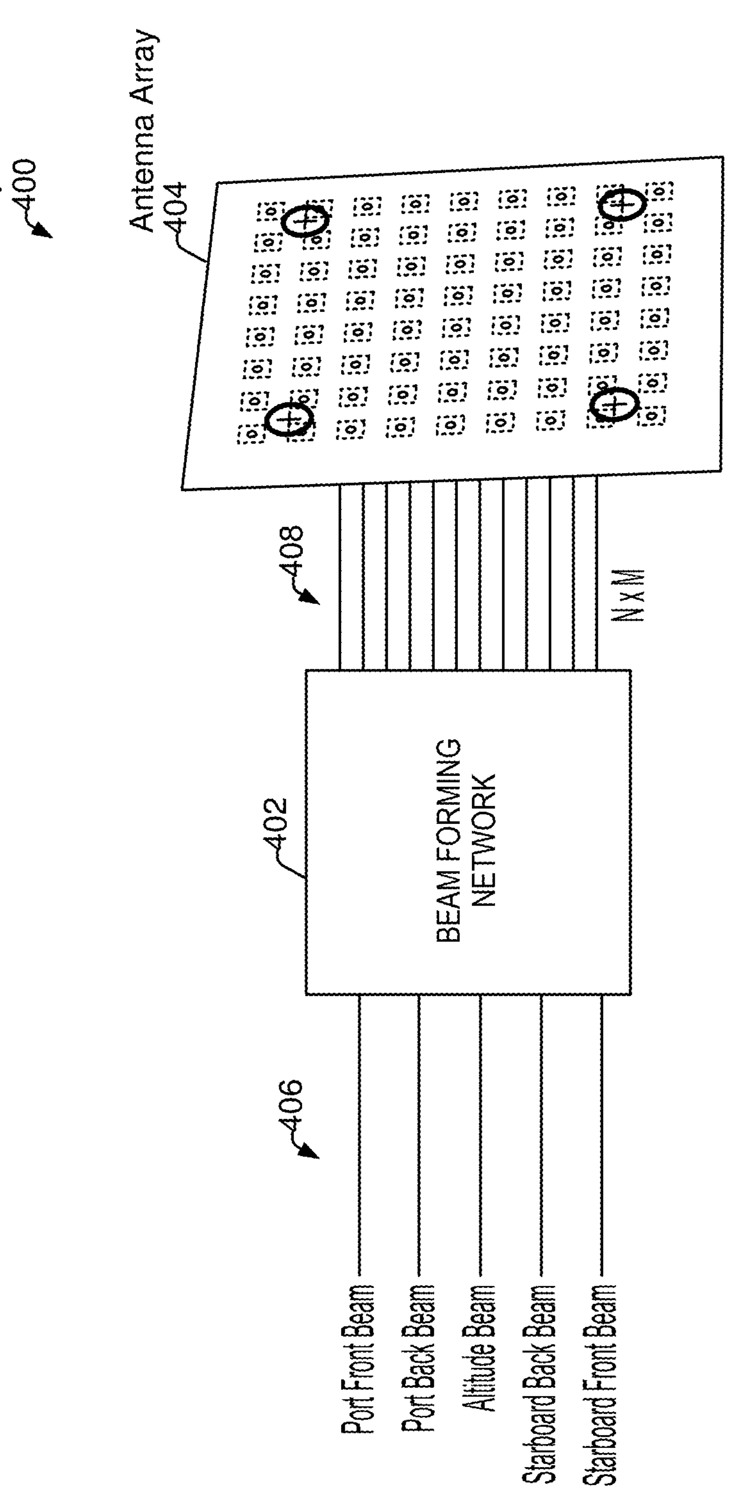
FIG. 4 is a diagram that illustrates an example of a system for beamforming via a surface-mountable antenna array of a radio device according to one or more aspects of the present disclosure.

The beamforming network 240 can receive the output RF signal from the switch 236 (with an indication of which type of beam is to be transmitted), and optionally to receive other output RF signals to be transmitted, and the beamforming network 240 can perform beamforming to generate one or more output RF waveforms for transmission via the beamforming network 240, as further described herein with reference to FIG. 4. The beamforming can be performed based on a preconfigured RF network or an active switching network, such that the beamforming network 240 produces a set of beams for transmission and reception via the antenna array 250.

After transmitting the one or more output RF waveforms, the antenna array 250 can receive one or more return RF waveforms as a result of the transmissions. For example, a return RF waveform can be a reflection of the altitude transmit beam or the one or more Doppler transmit beams, and thus be referred to as an altitude receive beam signal or a Doppler receive beam signal. The antenna controller state machine 238 can be configured to, based on a determination of the current state of the antenna subsystem, send control signaling to the switch 236 to provide an RF signal on one of the lines from the beamforming network 240 as an input to the ADC 234. For example, if the antenna controller state machine 238 determines that the current state is an altitude receive state, the antenna controller state machine 238 can provide control signaling to the switch 236 to cause the switch 236 to provide the return RF signal to the ADC 234 as an altitude receive RF signal. The ADC 234 can convert the altitude receive RF signal to a digitized signal that can be provided to the serializer 232 for serializing with the altitude output RF signal (e.g., the signal before transmission via the antenna array 250) and modulation by the modulator 230 to generate a portion of a bit stream. Alternatively, if the antenna controller state machine 238 determines that the current state is one of one or more Doppler receive states, the antenna controller state machine 238 can provide control signaling to the switch 236 to cause the switch 236 to provide the return RF signal to the ADC 234 as a Doppler receive RF signal, such as a port front receive RF signal, a port back receive RF signal, a starboard back receive RF signal, or a starboard front receive RF signal, as non-limiting examples. In some examples, regardless of whether performing radio altimeter functionality or Doppler radar functionality, the receive RF signal and the output RF signal are down-converted to baseband and sampled at a particular sampling rate by the ADC 234 to generate the digitized signals, which represent digitized samples of the in-phase and quadrature (I and Q) components of the respective RF signals.

The ADC 234 can convert the Doppler receive RF signal to a digitized signal that can be provided to the serializer 232 for serializing with the respective Doppler output RF signal (e.g., the respective signal before transmission via the antenna array 250) and modulation by the modulator 230 to generate a portion of the bit stream. The bit stream can pass through the diplexer 222, and the second electrical connector 221 can be configured to communicate the bit stream to the RF unit 202 via the RF cable 218. Because the bit stream has already been digitized before being communicated via the electrical connectors 216, 221 and the RF cable 218, any faults associated with the electrical connectors 216, 221 or the RF cable 218 will affect whether the data is communicated, but will not affect the accuracy or integrity of the measurements represented by the data, as is possible in conventional radio altimeters that communicate analog return signals through electrical connections and cables.

The first electrical connector 216 can receive the bit stream from the antenna subsystem 220 via the RF cable 218, which is passed through the diplexer 210 upon reception. The demodulator 212 can be configured to demodulate the bit stream to generate a demodulated bit stream, and the deserializer 214 can be configured to deserialize the demodulated bit stream to obtain a digitized output signal and a digitized return signal (e.g., digitized data that represents the RF output signal prior to transmission by the antenna array 250 and the RF return signal received by the antenna array 250). For example, the RF output signal can include or correspond to the altitude transmit RF signal and the RF return signal can include or correspond to the altitude receive RF signal. As another example, the RF output signal can include or correspond to a Doppler transmit RF signal, such as the port front transmit RF signal, and the RF return signal can include or correspond to a Doppler return RF signal, such as the port front receive RF signal. The DSP 204 can receive the deserialized digitized representations of the RF signals and can analyze the digitized representations (e.g., derived from portions of the bit stream) to determine an altitude indicator or altitude measurement, a speed indicator or speed measurement, other information, or a combination thereof, as described above with reference to FIG. 1.

In some implementations, the radio device 200 can be configured to generate output RF waveforms, via the antenna array 250, that are configured to prevent, or reduce the likelihood of, jamming or spoofing of signals transmitted by the antenna array 250. For example, the RF unit 202 can cause the antenna subsystem 220 to transmit signals and receive return signals in a particular frequency range, such as approximately 13.25 GHz to 13.4 GHz, to avoid unintentional interference by other common wireless communication technologies. Alternatively, the transmit signals and return signals can be in a range from approximately 4.2 GHz to approximately 4.4 GHz, or other frequency ranges having sufficient bandwidth (e.g., >=150 MHz). As another example, the RF unit 202 can operate in a first frequency band (e.g., approximately 4.2 GHz to approximately 4.4 GHz) for performance of altimeter measurement operations and in a second frequency band (e.g., approximately 13.25 GHz to approximately 13.4 GHz) for performance of Doppler-based measurement operations. As another example, the RF unit 202 can provide output RF signals that are modulated using OFDM, and in some implementations, by configuring the output RF waveforms to include pseudo-random noise through use of DSSS or other spread spectrum techniques, which have good auto-correlation properties and support use of a low post-correlation bandwidth to support high processing gain and which can sufficiently randomize the output RF waveforms such that a malicious entity is not capable of predicting the output RF waveform in advance in order to jam or spoof performance of altimeter or Doppler-based measurement operations.

In some implementations, the RF unit 202 can generate the code sequences used to create the output RF signals pseudo-randomly. For example, the RF unit 202 may pseudo-randomly generate a watermark, such as a pseudo-randomly generated bit string, that is included in the output RF signal. In some implementations, the RF unit 202 may select the watermark from a pool of long codes, and the selection may be performed randomly or pseudo-randomly. The RF unit 202 can maintain the pseudo-random message (e.g., the watermark) for use in comparing to digitized return signals, thereby authenticating digitized return signals that include matching watermark or data messages. For example, the RF unit 202 can compare a watermark or data message included in a digitized return signal to a watermark or data message in the corresponding digitized output signal that triggered receipt of the return RF signal, and if the watermarks or data messages match, the RF unit 202 can authenticate the digitized return RF signal for use in generating altitude or ground speed measurements. However, if the watermarks do not match, the RF unit 202 can ignore the digitized return RF signal, and optionally initiate performance of one or more operations to report or otherwise deal with a possible spoofing situation, such as generating an alert.

Because the watermarks or data messages are pseudo-randomly generated, a malicious entity on the ground lacks advanced knowledge of the watermark and lacks sufficient time, due to the speed of the vehicle, to decode a received RF waveform and extract the watermark or data message to insert in a spoofed RF waveform. In this manner, the radio device 200 improves security and performance, as compared to other radio altimeters or Doppler radars, without requiring cryptographic coding which can increase cost, complexity, and power consumption of the radio device 200. In some other implementations, the RF unit 202 generates a cryptographic code for inclusion in the output RF signal, if security concerns outweigh the increased cost, complexity, and power consumption associated with the cryptographic coding, and the RF unit 202 performs cryptographic decoding on the digitized return RF signal as part of the authentication process.

Figure 3:
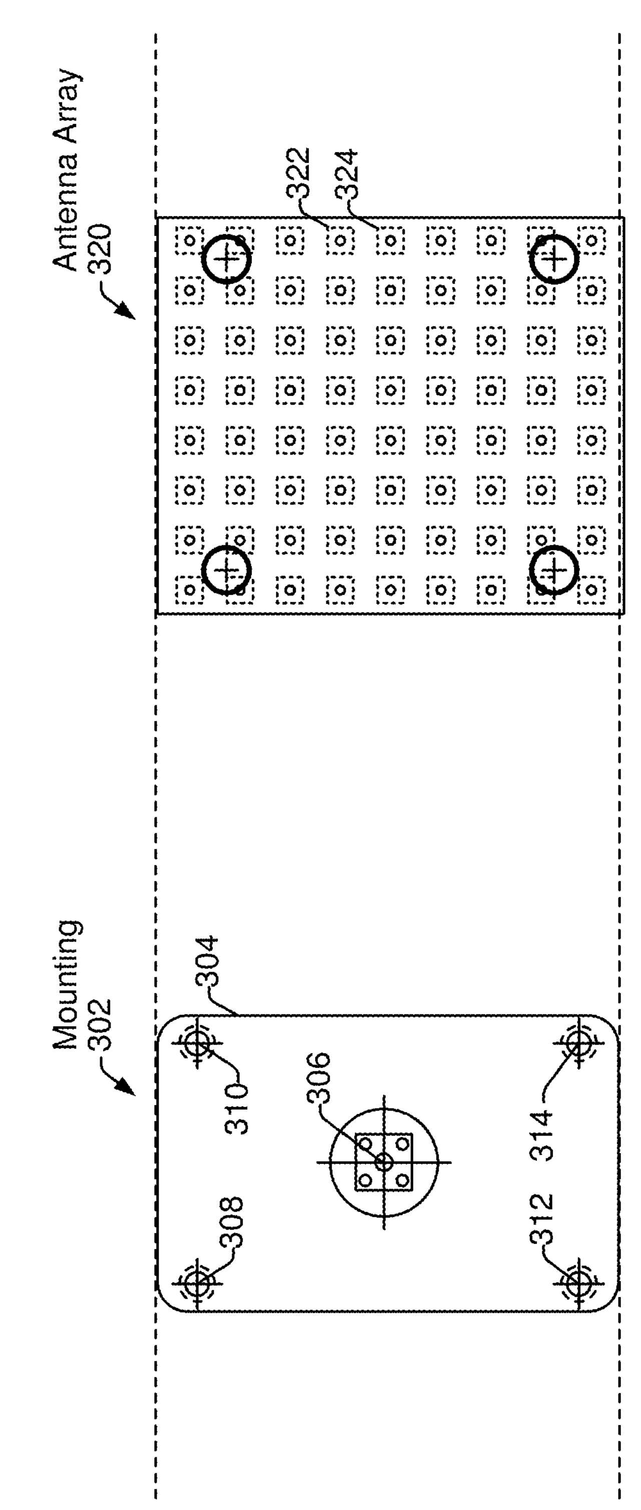
FIG. 3 is a diagram that illustrates an example of an expanded view of a surface-mountable antenna array of a radio device according to one or more aspects of the present disclosure.

FIG. 3 depicts an example of an expanded view of a surface-mountable antenna array 300 of a radio device according to one or more aspects of the present disclosure. The surface-mountable antenna array 300 can be included in a radio device that provides radio altimeter functionality, Doppler radar functionality, or a combination of radio altimeter functionality and Doppler radar functionality. In some implementations, the surface-mountable antenna array 300 of FIG. 3 can include or correspond to the surface-mountable antenna module 104 of FIG. 1 or the antenna array 250 of FIG. 2 or an antenna array of a radio device as described further herein with reference FIG. 9. The surface-mountable antenna array 300 depicted in FIG. 3 includes a mounting 302 and an antenna array 320 coupled to the mounting. The mounting 302 can include or correspond to a plate or other mounting surface that is configured to be mounted on a particular surface of a vehicle, such as a bottom surface of an aircraft, as further described herein with reference to FIG. 5. The mounting 302 can be affixed to the surface of the vehicle by a plate 304 and one or more screws or other fasteners. The mounting 302 can include a center 306 and one or more mounting holes (e.g., through holes), such as a first mounting hole 308, a second mounting hole 310, a third mounting hole 312, and a fourth mounting hole 314, for coupling the antenna array 320 to the mounting 302. Although four mounting holes are shown in FIG. 3, in some other implementations, there can be more than four or fewer than four mounting holes, or the mounting holes 308-314 can be omitted if the antenna array 320 is coupled to the mounting 302 using other hardware or techniques. A mounting hole pattern defined by the mounting holes 308-312 can be specified by an industry standard, such as the ARINC 707 standard.

In some implementations, the mounting 302 can have a footprint that is specified by an industry standard, such as the ARINC 707 standard. For example, a first dimension (a width in the orientation shown in FIG. 3) of the mounting 302 can be within a range between 3.5 and 3.55 inches, a second dimension (a height in the orientation shown in FIG. 3) of the mounting 302 can be within a range between 4.1 and 4.5 inches, a distance between a center of the third mounting hole 312 and a center of the fourth mounting hole 314 can be within a range between 2.73 and 2.77 inches, a distance between the left side (in the orientation shown in FIG. 3) of the mounting 302 and the center 306 can be within a range between 1.745 and 1.775 inches, a distance between the center of the third mounting hole 312 and the center 306 can be approximately 1.375 inches, a distance between the top (in the orientation shown in FIG. 3) and the bottom (in the orientation shown in FIG. 3) of the mounting 302 can be within a range between 4.1 and 4.15 inches, a distance between the center of the first mounting hole 308 and the center of the third mounting hole 312 can be within a range between 2.88 and 2.92 inches, a distance between the center 306 and the bottom (in the orientation shown in FIG. 3) of the mounting 302 can be within a range between 2.035 and 2.065 inches, and a distance between the center 306 and the center of the third mounting hole 312 can be approximately 1.375 inches.

The antenna array 320 can be coupled to the mounting 302. It is noted that the reference points are depicted on the antenna array 320 to indicate location of the mounting holes 308-314, and thus the alignment of the antenna array 320, when the antenna array 320 is coupled to the mounting 302. The antenna array 320 includes a plurality of antenna patches that are arranged in rows and columns with respect to the orientation shown in FIG. 3. Each antenna patch can have a substantially square shape and include a respective antenna element of the antenna array 320. In some implementations, a first antenna patch 322 has a substantially square shape with a side having a length that is based on approximately one-fourth of a wavelength of the return RF signal. In some such implementations, a second antenna patch 324 is substantially identical to the first antenna patch 322, and the second antenna patch 324 can be positioned a distance that is based on approximately one-half of the wavelength of the return RF signal from the first antenna patch 322. In some implementations, the antenna array 320 is configured to have a surface area selected such that the surface-mountable antenna array 300 is compatible with an ARINC 707 standard radio altimeter footprint. For example, the antenna array 320 can include nine rows and eight columns of antenna patches having the above-described dimensions.

In some other implementations, the surface area of the antenna array 320 can be larger or smaller than is compatible with the ARINC 707 standard radio altimeter footprint if the mounting hole pattern defined by the mounting holes 308-314 is compatible with the ARINC 707 standard. As an illustrative example, the antenna array 320 can include fourteen rows and thirteen columns of antenna patches having the above-described dimensions, and the surface area can be one inch larger on each side than the ARINC 707 compliant footprint, which can increase the beamforming and signaling capabilities of the antenna array 320 without significantly increasing the cost and complexity of replacing existing radio altimeters with radio devices having the surface-mountable antenna array 300 that has the mounting hole pattern defined by the mounting holes 308-314. In such an example, the surface-mountable antenna array 300 would be capable of generating more focused antenna beams which can provide more accurate height measurements, speed measurements, or a combination thereof, and an RF gasket or other adapter device may be utilized to enable replacement of a conventional antenna with the surface-mountable antenna array 300.

FIG. 4 depicts an example of a system 400 for beamforming via a surface-mountable antenna array of a radio device according to one or more aspects of the present disclosure. The system 400 can be included in or utilized by a radio device that provides radio altimeter functionality, Doppler radar functionality, or a combination of radio altimeter functionality and Doppler radar functionality In some implementations, the system 400 of FIG. 4 can be included in or correspond to the surface-mountable antenna module 104 of FIG. 1, the antenna subsystem 220 of FIG. 2, the surface-mountable antenna array 300 of FIG. 3, or a radio device as described further herein with reference FIG. 9. The system 400 includes a beamforming network 402 and an antenna array 404. The beamforming network 402 is configured to receive RF signals via a plurality of inputs 406 and to perform beamforming on the RF signals to generate beam signals that are output via a plurality of outputs 408 to the antenna array 404 for transmission as one or more antenna beams that form output RF waveforms. In some implementations, the system 400 can be used to perform altimeter and Doppler-based radar operations, and the antenna array 404 can include a 9×8 antenna array, as described above with reference to FIG. 3. In some such implementations, the plurality of inputs can include an altitude beam, a port front beam, a port back beam, a starboard back beam, and a starboard front beam, and the plurality of outputs can include outputs sufficient for a 9×8 antenna array (e.g., an antenna array having nine rows and eight columns of antenna patches).

In some other implementations, the inputs can include inputs for other beam arrangements, such as a front beam, a rear beam, a right beam, and a left beam, as a non-limiting example. Other beam arrangements are possible, as well as beams being directed to the ground at different angles. Beam angle and geometry can affect the accuracy of altitude and/or ground speed measurements, and as such, beam angle and beam geometry can be selected to provide beam geometries associated with target accuracy levels. Additionally, or alternatively, the antenna array 404 can be an N×M antenna array, where N is more or less than nine, M is more or less than eight, or both, and/or the plurality of inputs 406 can include or correspond to less than five or more than five inputs, which can include different inputs than one altitude beam and four Doppler-based beams.

The beamforming network 402 (e.g., a beamformer) can be configured to form a plurality of beams to be transmit and/or received by the antenna array 404 according to a beamforming pattern. In some implementations, the beamforming pattern is a preconfigured beamforming network configuration, which can also be referred to as performing passive beamforming or beamforming using a preconfigured beamforming network. For example, the preconfigured beamforming network configuration can be established according to a two-dimensional Butler matrix. In this example, the Butler matrix is a beamforming network configuration that can be constructed from passive devices, such as directional couplers and phase shifters, that controls the direction of a plurality of RF beams at the antenna array 404. For example, five fixed beams (e.g., an altitude beam and four Doppler-based beams) can be sequenced by an RF unit and provided to the beamforming network 402 to sequentially output five RF waveforms via various antenna ports of the antenna array 404 in fixed directions. Similar sequencing and beamforming can occur for five RF return waveforms at the antenna array 404. In other examples, the preconfigured beamforming network configuration can be any fixed set of weightings and time delays, or phasings, that enable a combination of signals to be sent from or received by sensors in the antenna array 404 or that otherwise cause transmission or reception of a known, arbitrary beam configuration.

In some other implementations, the beamforming pattern corresponds to an active beamforming network, which can be referred to as performing active beamforming or beamforming using an active beamforming network. This type of beamforming pattern enables the beamforming network 402 to actively modify phase and amplitude parameters to form desired beams one at a time. For example, the beamforming weights (or other configuration) can be adapted or adjusted based on one or more parameters associated with the vehicle, in order to improve the coverage and/or beam angle performance of the antenna array 404. As non-limiting examples, the beamforming pattern that corresponds to the active beamforming network can be based on an altitude of the vehicle, a speed of a vehicle, an attitude of the vehicle, a GPS-denied status of the vehicle, a physical configuration of the antenna array 404, other parameters, or a combination thereof. As an example, the beam angles associated with the Doppler-based beams can be modified based on the altitude of the vehicle, such as to reduce a length of the Doppler-based beams to the ground below the vehicle. As another example, a beamforming pattern can be switched to an active beamforming network configuration based on detection of a GPS-denied status of the vehicle. The active beamforming network configuration can include or correspond to use of a multiple signal classification (MUSIC) algorithm or an iterative sparse asymptotic minimum variance (SAMV) algorithm, or other active beamforming algorithms.

Figure 5:
FIG. 5 is a diagram that illustrates an example of an aircraft using a radio device that includes a surface-mountable antenna array according to one or more aspects of the present disclosure.
Figure 5:
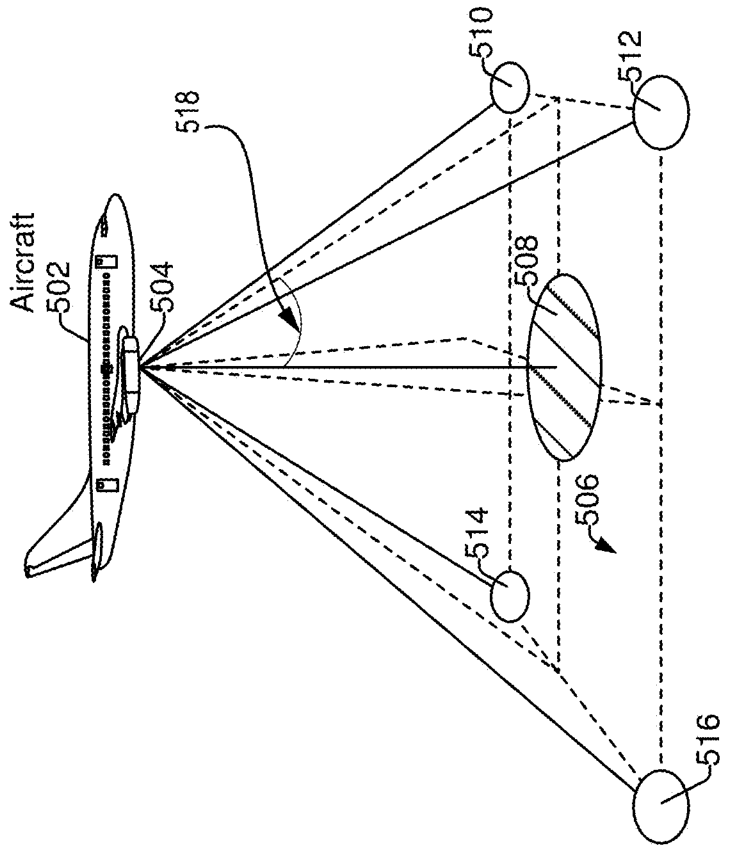

FIG. 5 depicts an example 500 of an aircraft 502 that uses a radio device that includes a surface-mountable antenna array 504 according to one or more aspects of the present disclosure. The surface-mountable antenna array 504 can be included in a radio device that provides radio altimeter functionality, Doppler radar functionality, or a combination of radio altimeter functionality and Doppler radar functionality. In some implementations, the surface-mountable antenna array 504 includes or corresponds to the surface-mountable antenna module 104 of FIG. 1, the antenna subsystem 220 of FIG. 2, the surface-mountable antenna array 300 of FIG. 3, the system 400 of FIG. 4, or a radio device as described further herein with reference FIG. 9. FIG. 5 depicts the aircraft 502 during a typical portion of a flight, such that the aircraft 502 is located above ground 506 in the illustrated orientation. As shown in FIG. 5, the surface-mountable antenna array 504 can be coupled to a bottom surface of the aircraft 502, such that the surface-mountable antenna array 504 is located on the surface of the aircraft 502 that is closest to the ground 506 during a substantial portion of the flight. In some other implementations, the surface-mountable antenna array 504 can be coupled to a nose of the aircraft, a side surface of the aircraft 502, or to another location.

In the example 500 shown in FIG. 5, the surface-mountable antenna array 504 can transmit a plurality of output RF waveforms as beams toward the ground 506. For example, the plurality of beams can include an altitude beam 508, a port front beam 510, a starboard front beam 512, a port back beam 514, and a starboard back beam 516. The beam arrangement shown in FIG. 5 is illustrative, and other implementations can use other beam arrangements or configurations. In some implementations, the altitude beam 508 is configured to be directed below the aircraft 502, such as at a substantially 90-degree angle. The port front beam 510 and the port starboard beam 512 can be directed forward from the altitude beam 508, with respect to the aircraft 502, and with each of the beams directed toward one of the port side or the starboard side of the aircraft 502. Similarly, the port back beam 514 and the starboard back beam 516 can be directed backward from the altitude beam 508, with respect to the aircraft 502, and with each of the beams directed toward one of the port side or the starboard side of the aircraft 502. The port front beam 510 and the starboard front beam 512 can be directed forward with respect to the altitude beam 508 at an angle of beam depression 518, and the port back beam 514 and the starboard back beam 516 can be directed backward with respect to the altitude beam 508 by the same angle of beam depression 518. In some implementations, the angle of beam depression 518 is selected from a range of 10 degrees to 60 degrees.

The altitude beam 508 is configured to transmit an altitude output RF signal used during performance of an altitude measurement operation (e.g., an altimeter operation). For example, the altitude beam 508 can communicate the altitude output RF signal toward the ground 506 such that a reflection of the altitude output RF signal is received by the surface-mountable antenna array 504 as the altitude return RF signal. The other beams 510, 512, 514, and 516 are configured to transmit Doppler-based output RF signals used during performance of a Doppler-based speed measurement operation. For example, the port front beam 510 can communicate the first output RF signal toward the ground 506 such that a reflection of the first output RF signal is received by the surface-mountable antenna array 504 as a first return RF signal, the starboard front beam 512 can communicate the second output RF signal toward the ground 506 such that a reflection of the second output RF signal is received by the surface-mountable antenna array 504 as a second return RF signal, the port back beam 514 can communicate the third output RF signal toward the ground 506 such that a reflection of the third output RF signal is received by the surface-mountable antenna array 504 as a third return RF signal, the starboard back beam 516 can communicate the fourth output RF signal toward the ground 506 such that a reflection of the fourth output RF signal is received by the surface-mountable antenna array 504 as a fourth return RF signal, and these output RF signals and return RF signals can be used to determine a speed of the aircraft 502. The beams 510, 512, 514, and 516 can have a substantially similar beam area, and a beam area of the altitude beam 508 can be substantially the same or different from the beam area of the beams 510, 512, 514, and 516. In some implementations, the beam width of the altitude beam 508 is larger, such as two to three times larger, than the beam width of the beams 510, 512, 514, and 516 to accommodate a bank angle of the aircraft 502, such as a +/− twenty-degree bank angle, as a non-limiting example. Additionally, narrower beams for Doppler-based measurements can prevent "smearing" (e.g., variation in frequency of return signals due to differences in the areas that are targeted by the beams).

Figure 6:
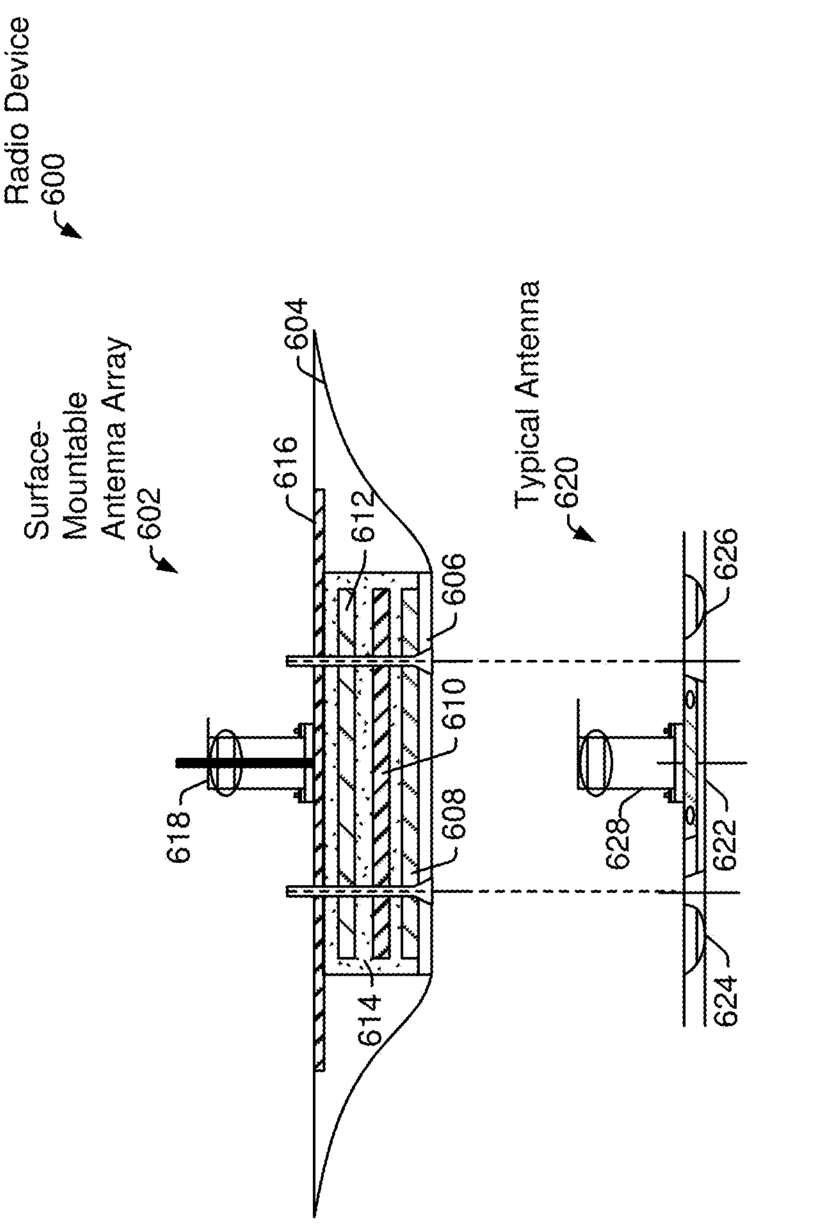
FIG. 6 is a diagram that depicts a cross-section of aspects of a radio device that includes a surface-mountable antenna array according to one or more aspects of the present disclosure.

FIG. 6 depicts a cross-section of aspects of a radio device 600 that includes a surface-mountable antenna array according to one or more aspects of the present disclosure. The radio device 600 can provide radio altimeter functionality, Doppler radar functionality, or a combination of radio altimeter functionality and Doppler radar functionality. In some implementations, the radio device 600 of FIG. 6 can include or correspond to the radio device 100 of FIG. 1, the radio device 200 of FIG. 2, a radio device that includes the surface-mountable antenna array 300 of FIG. 3, a radio device that includes the system 400 of FIG. 4, the radio device used by the aircraft 502 of FIG. 5, a radio device as described further herein with reference FIG. 9, or a combination thereof.

The radio device 600 includes a surface-mountable antenna array 602 that is configured to be coupled to, or mounted upon, a surface of a vehicle, such as the bottom surface of an aircraft. In the example shown in FIG. 6, the surface-mountable antenna array 602 includes a housing 604 that encloses a layer stack that is configured to operate as an antenna module or antenna subsystem. The housing 604 can be coupled to the surface of an aircraft or other vehicle via one or more mounting holes (e.g., through holes), as described above with reference to FIG. 3. In some implementations, the housing 604 includes or corresponds to, or is shaped as, an airfoil that can reduce drag to an aircraft to which the surface-mountable antenna array 602 is coupled. The layer stack can include multiple layers that are stacked between a radome material layer 606 (e.g., a bottom layer in the orientation shown in FIG. 6, which can be a part of a wall of the housing 604) and a mounting layer 616 (e.g., a top layer in the orientation shown in FIG. 6). The radome material layer 606 can include any material that is capable of protecting the other layers from weather and damage, in addition to being permissive to the passage of RF waves. The mounting layer 616 can include a material that acts as a wall of the housing 604 and that is configured to be coupled to the surface of the vehicle, such as a metal or a metal alloy.

The multiple layers between the radome material layer 606 and the mounting layer 616 can include an antenna array 608, a beamforming network 610, and a circuitry layer 612. In some implementations, the antenna array 608, the beamforming network 610, and the circuitry layer 612 are located within a hermetically sealed compartment 614 between the radome material layer 606 and the mounting layer 616.

The antenna array 608 can include multiple antenna patches arranged in rows and columns, as described above with reference to FIGS. 3-4. The beamforming network 610 can be configured to apply beamforming weights and otherwise enable generation of selected antenna beams, according to a beamforming network configuration, as described above with reference to FIGS. 2 and 4. The circuitry layer 612 can include circuitry configured to perform some RF processing, as well as analog-to-digital conversion, serialization, and modulation, as described above with reference to FIGS. 1-2. The surface-mountable antenna array 602 can also include an electrical connector 618 that is configured to connect to an RF cable, such as a coaxial cable, that is coupled to the surface-mountable antenna array 602 and to an RF unit of the radio device 600. In addition to enabling communication of digitized and serialized signals to the RF unit, via the RF cable, the electrical connector 618 can be configured to receive DC power for the surface-mountable antenna array 602, such as via a center conductor.

FIG. 6 also depicts a cross-section of an example of a typical radio altimeter antenna 620, such as a radio altimeter that is replaced with the surface-mountable antenna array 602 of a combined radio altimeter/Doppler radar device during a retrofit operation. The typical radio altimeter antenna 620 includes an antenna array 622 that is mounted to a surface of an aircraft, a transmitter 624, a receiver 626, and an electrical connector 628 that is configured to be coupled to an LRU of the aircraft. As shown in FIG. 6, the surface-mountable antenna array 602 has substantially the same form factor (e.g., footprint) and/or mounting hole pattern as the typical radio altimeter antenna 620. For example, a width of the surface-mountable antenna array 602 is substantially similar to a width of the typical radio altimeter antenna 620, and mounting holes in the surface-mountable antenna array 602 may be located in approximately the same locations as mounting holes in the typical radio altimeter antenna 620, as indicated by the dotted lines in FIG. 6. As such, the surface-mountable antenna array 602 of the combined radio altimeter/Doppler radar device may be coupled to the aircraft in the same location as the typical radio altimeter antenna 620, without substantially increasing a footprint occupied on the surface of the aircraft by the surface-mountable antenna array 602 and/or without requiring new mounting holes or other modifications to the aircraft.

Figure 7:
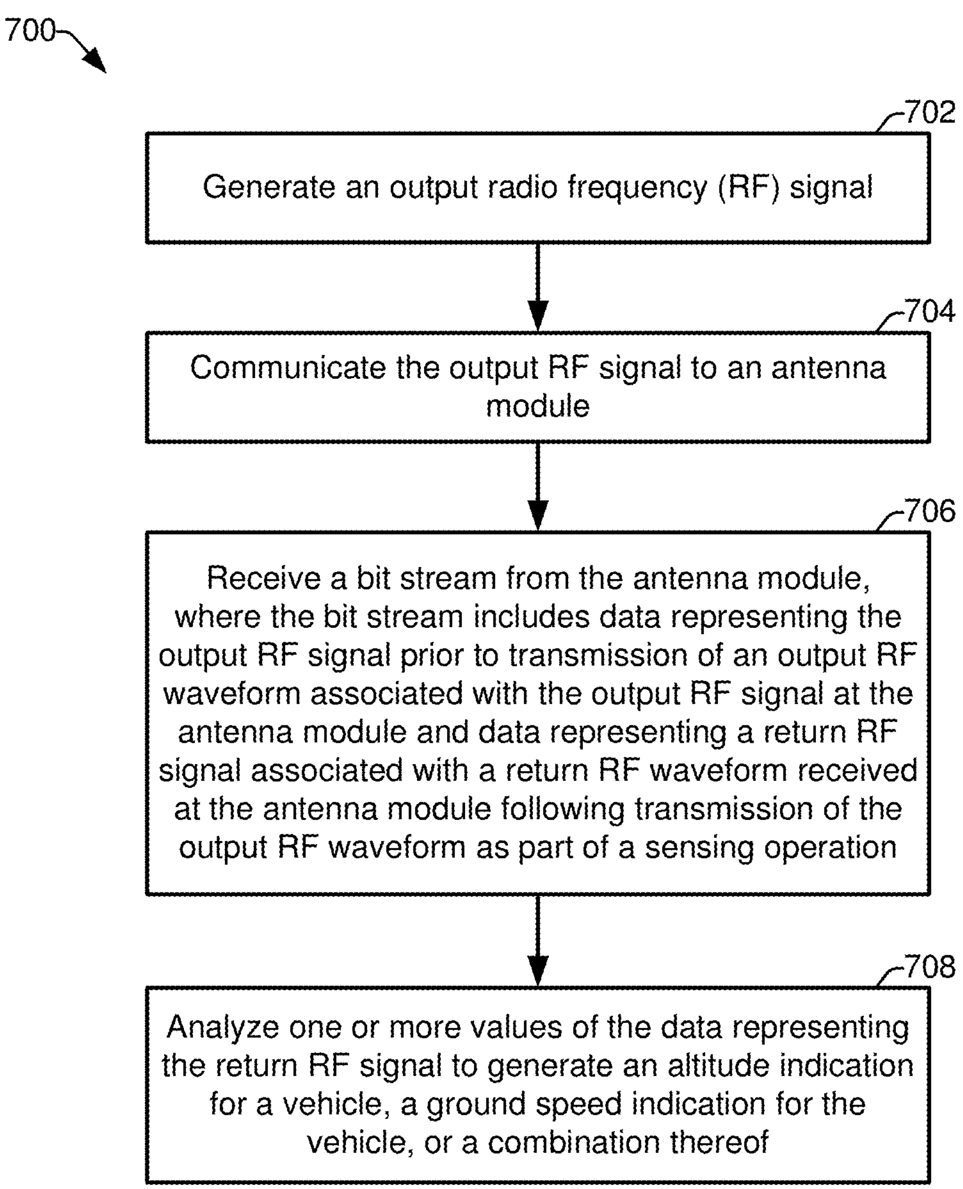
FIG. 7 is a diagram that illustrates a flow chart of an example of a method of measuring an altitude and/or ground speed of a vehicle using a radio device that includes a surface-mountable antenna array according to one or more aspects of the present disclosure.

FIG. 7 is a flowchart that illustrates an example of a method 700 of measuring an altitude and/or ground speed of a vehicle using a radio device that includes a surface-mountable antenna array according to one or more aspects of the present disclosure. The radio device can provide radio altimeter functionality, Doppler radar functionality, or a combination of radio altimeter functionality and Doppler radar functionality. The method 700 can be initiated, performed, or controlled by one or more processors executing instructions, or by circuitry configured to cause performance of one or more operations, such as resides within the RF unit 102 of FIG. 1, the RF unit 202 of FIG. 2, or a combination thereof.

In some implementations, the method 700 includes, at block 702, generating an output RF signal. For example, the RF unit 102 of FIG. 1 can generate an output RF signal. The method 700 also includes, at block 704, communicating the output RF signal to an antenna module. For example, the RF unit 102 of FIG. 1 can communicate the RF signal to the surface-mountable antenna module 104 via the RF cable 106.

The method 700 includes, at block 706, receiving a bit stream from the antenna module. For example, the RF unit 102 of FIG. 1 can receive a bit stream generated by the surface-mountable antenna module 104. The bit stream includes data representing the output RF signal prior to transmission of an output RF waveform associated with the output RF signal at the antenna module and data representing a return RF signal associated with a return RF waveform received at the antenna module following transmission of the output RF waveform as part of a sensing operation. The method 700 includes, at block 708, analyzing one or more values of the data representing the return RF signal to generate an altitude indication for a vehicle, a ground speed indication for the vehicle, or a combination thereof. For example, the RF unit 102 can analyze data extracted from the bit stream to generate an altitude indication for a vehicle, such as an aircraft, to which the surface-mountable antenna module 104 is coupled.

In some implementations, the method 700 can include more, fewer, and/or different steps without departing from the scope of the subject disclosure. For example, the method 700 can also include analyzing one or more additional values of the data representing the return RF signal to generate a ground speed indication for the vehicle. As another example, the method 700 can also include comparing a portion of the output RF signal to a portion of the bit stream associated with the output RF signal prior to transmission of the output RF waveform at the antenna module to generate an RF output discrepancy metric and generating an RF output discrepancy indication based on the RF output discrepancy metric exceeding an RF output discrepancy threshold. As another example, the method 700 can include generating a beamforming signal for transmission to the antenna module. The beamforming signal includes data indicative of a beamforming pattern, a beamforming sequence location, or a combination thereof.

Figure 8:
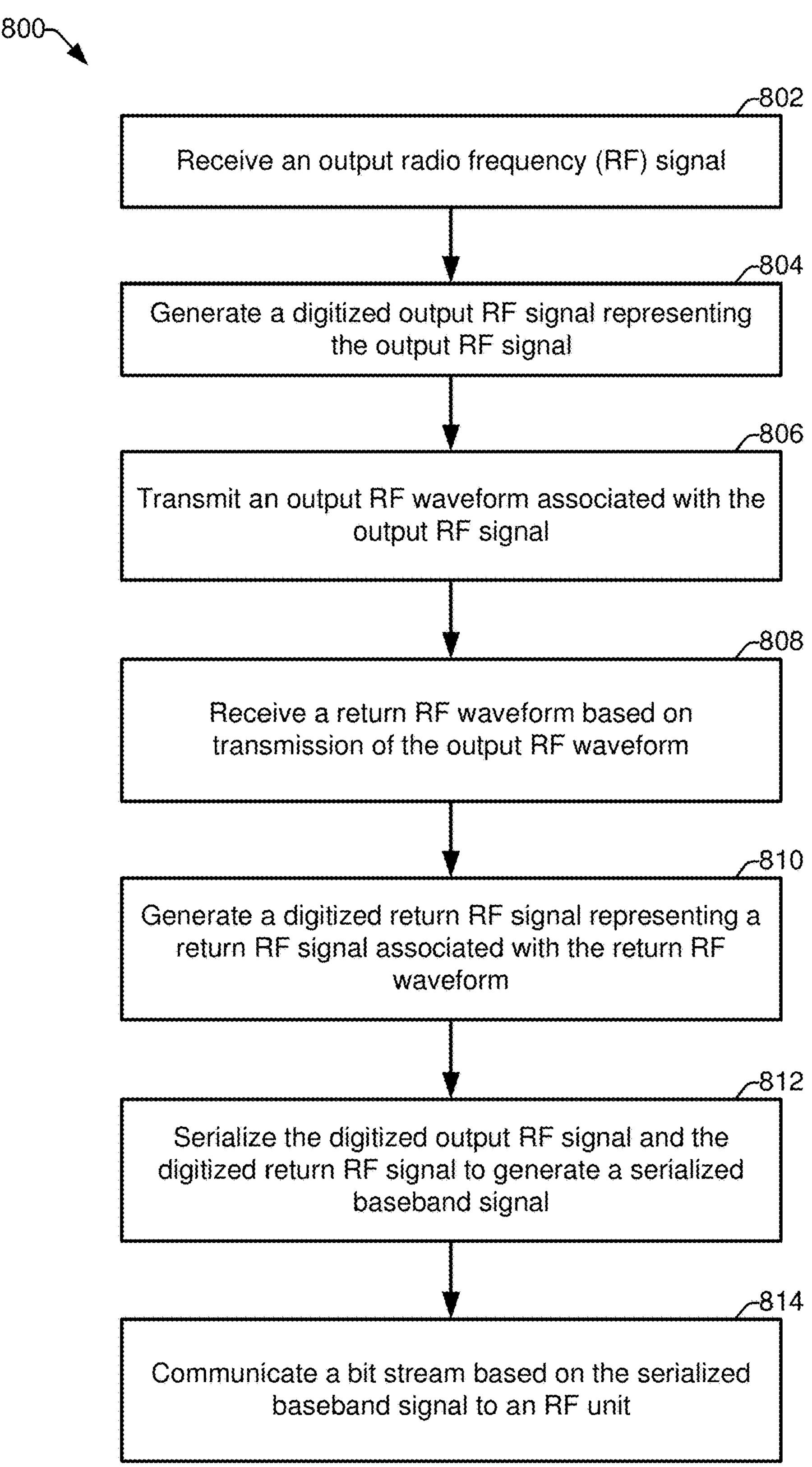
FIG. 8 is a diagram that illustrates a flow chart of an example of a method of measuring an altitude and/or ground speed of a vehicle using a radio device that includes a surface-mountable antenna array according to one or more aspects of the present disclosure.

FIG. 8 is a flowchart that illustrates an example of a method 800 of measuring an altitude and/or ground speed of a vehicle using a radio device that includes a surface-mountable antenna array according to one or more aspects of the present disclosure. The radio device can provide radio altimeter functionality, Doppler radar functionality, or a combination of radio altimeter functionality and Doppler radar functionality. The method 800 can be initiated, performed, or controlled by one or more processors executing instructions, or by circuitry configured to cause performance of one or more operations, such as resides within surface-mountable antenna module 104 of FIG. 1, the antenna subsystem 220 of FIG. 2, or a combination thereof.

In some implementations, the method 800 includes, at block 802, receiving an output RF signal. For example, the surface-mountable antenna module 104 of FIG. 1 can receive an output RF signal from the RF unit 102 via the RF cable 106. The method 800 also includes, at block 804, generating a digitized output RF signal representing the output RF signal. For example, the surface-mountable antenna module 104 of FIG. 1 can generate a digitized version of the output RF signal.

The method 800 includes, at block 806, transmitting an output RF waveform associated with the output RF signal. For example, the surface-mountable antenna module 104 of FIG. 1 can transmit an output RF waveform associated with the output RF signal received from the RF unit 102. The method 800 includes, at block 808, receiving a return RF waveform based on transmission of the output RF waveform. For example, the surface-mountable antenna module 104 of FIG. 1 can receive a return RF waveform that is a reflection, from the ground, of the output RF waveform.

The method 800 includes, at block 810, generating a digitized return RF signal representing a return RF signal associated with the return RF waveform. For example, the surface-mountable antenna module 104 of FIG. 1 can generate a digitized version of the return RF signal. The method 800 includes, at block 812, serializing the digitized output RF signal and the digitized return RF signal to generate a serialized baseband signal. For example, the surface-mountable antenna module 104 of FIG. 1 can serialize the digitized RF output signal and the digitized RF return signal to generate a serialized baseband signal.

The method 800 includes, at block 814, communicating a bit stream based on the serialized baseband signal to an RF unit. The RF unit is configured to generate an altitude measurement for a vehicle based on the serialized baseband signal. For example, the surface-mountable antenna module 104 of FIG. 1 can communicate the serialized baseband signal as a bit stream to the RF unit 102, and the RF unit 102 can determine an altitude of the vehicle, a ground speed of the vehicle, or both, based on analyzing the bit stream.

In some implementations, the method 800 can include more, fewer, and/or different steps without departing from the scope of the subject disclosure. For example, the method 800 can also include modulating the serialized baseband signal to generate a modulated digitized RF signal.

The methods described above with reference to FIGS. 7 and 8 can be implemented to realize one or more of the technical advantages described in more detail above. For example, the methods 700 and 800 can enable radio altimeter functionality, such as altitude measuring for a vehicle above the ground, that is more robust and accurate than using other types of radio altimeters. Additionally, the methods 700 and 800 can enable Doppler radar functionality, such as measuring a ground speed for the vehicle, that is more robust and accurate than using other types of Doppler radars. The radio altimeter functionality and/or Doppler radar functionality may be performed with a reduced, or eliminated, risk of being jammed or spoofed by a malicious entity.

Figure 9:
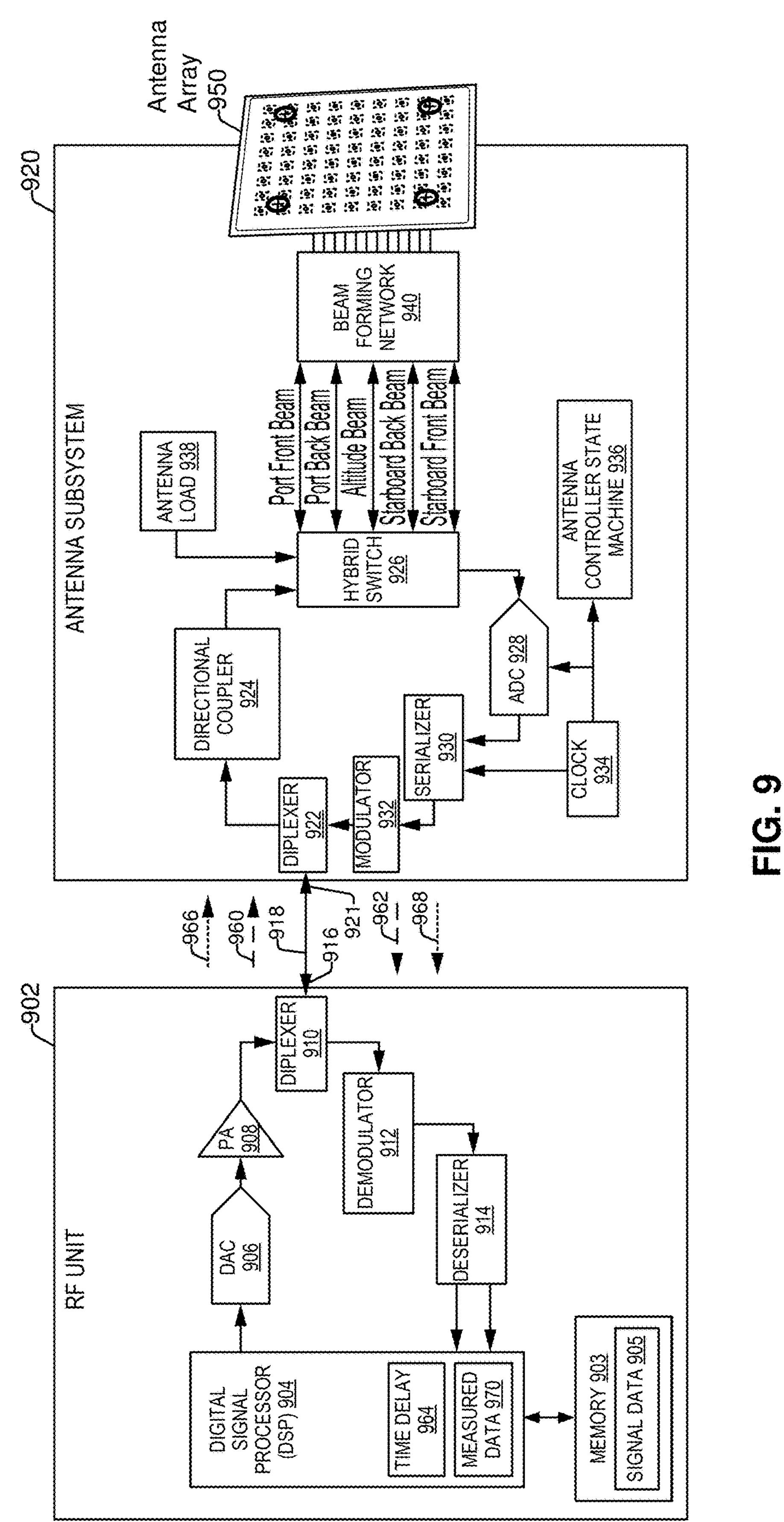
FIG. 9 is a block diagram of a particular implementation of a radio device that combines radio altimeter and Doppler radar functionality and that includes a surface-mountable antenna module with loop-back calibration according to one or more aspects of the present disclosure.

FIG. 9 depicts a particular implementation of a radio device 900 that combines radio altimeter and Doppler radar functionality and that includes a surface-mountable antenna module with loop-back calibration according to one or more aspects of the present disclosure. In some implementations, the radio device 900 of FIG. 9 (or portions thereof) can include or correspond to the radio device 100 of FIG. 1, the surface-mountable antenna array 300 of FIG. 3, the system 400 of FIG. 4, the surface-mountable antenna array 504 of FIG. 5, the radio device 600 of FIG. 6, or a combination thereof. In the implementation shown in FIG. 9, the radio device 900 includes an RF unit 902 coupled to an antenna subsystem 920 by an RF cable 918. In some implementations, the RF unit 902 includes or corresponds to an LRU or another component inside of a vehicle (e.g., an aircraft) and the antenna subsystem 920 includes or corresponds to components within a housing that is mounted to a surface, such as a bottom surface, of the aircraft in a different location than the RF unit 902.

The RF unit 902 includes a digital signal processor (DSP) 904, a digital-to-analog converter (DAC) 906, a power amplifier (PA) 908, a diplexer 910, a demodulator 912, a deserializer 914, and a first electrical connector 916. The DSP 904 is coupled to the DAC 906 and the deserializer 914. The DAC 906 is coupled to the DSP 904 and the PA 908. The PA 908 is coupled to the DAC 906 and the diplexer 910. The diplexer 910 is coupled to the PA 908, the first electrical connector 916, and the demodulator 912. The demodulator 912 is coupled to the diplexer 910 and the deserializer 914. The deserializer 914 is coupled to the demodulator 912 and the DSP 904. In some implementations, the RF unit 902 also includes a memory 903, which can be operated as a cache or other short-term memory and configured to store signal data 905. The signal data 905 can represent a digitized RF signal or information derived therefrom, as further described below. Although illustrated as external to the DSP 904 in FIG. 9, in other examples, the memory 903 may be included in or integrated with the DSP 904. In an alternate implementation, the RF unit 902 does not include the DSP 904.

The antenna subsystem 920 (e.g., a surface-mountable antenna module) includes a second electrical connector 921, a diplexer 922, a directional coupler 924, a hybrid switch 926, an analog-to-digital (ADC) 928, a serializer 930, a modulator 932, a clock 934, an antenna controller state machine 936, a beam forming network 940, and an antenna array 950. Although described as a state machine, in other implementations, the antenna controller state machine 936 may be a generalized processor or controller of any type, such as a microprocessor or microcontroller, as non-limiting examples. The diplexer 922 is coupled to the second electrical connector 921, the directional coupler 924, and the modulator 932. The directional coupler 924 is coupled to the diplexer 922 and the hybrid switch 926. The hybrid switch 926 is coupled to the directional coupler 924, the ADC 928, and the beam forming network 940. The beamforming network 940 is coupled to the hybrid switch 926 and the antenna array 950. The ADC 928 is coupled to the hybrid switch 926, the clock 934, and the serializer 930. The serializer 930 is coupled to the modulator 932, the ADC 928, and the clock 934. The clock 934 is coupled to the serializer 930, the ADC 928, and the antenna controller state machine 936. The antenna controller state machine 936 is coupled to and configured to control one or more other components of the antenna subsystem 920. In some implementations, the antenna subsystem 920 also includes an antenna load 938, which can be coupled to or placed near the antenna array 950, such that the antenna load 938 experiences similar conditions such as temperature, pressure, or the like, as the antenna array 950. In such implementations, the antenna load 938 is coupled to the hybrid switch 926. In an alternate implementation, the antenna subsystem 920 does not include the antenna load 938. The antenna subsystem 920, and the components thereof, can be enclosed within a housing configured to mount to an external surface of a vehicle, such as an aircraft or a spacecraft.

The first electrical connector 916 can be coupled to the second electrical connector 921 via the RF cable 918. In some implementations, the first electrical connector 916 and the second electrical connector 921 are coaxial connectors. Additionally, or alternatively, the first electrical connector 916 can be configured to receive power for the DAC 906, the PA 908, the demodulator 912, the deserializer 914, or a combination thereof, and the second electrical connector 921 can be configured to receive power for the hybrid switch 926, the ADC 928, the serializer 930, the modulator 932, the clock 934, the antenna controller state machine 936, the beamforming network 940, or a combination thereof.

Although FIG. 9 illustrates the RF unit 902 and the antenna subsystem 920 as including particular individual components, in other implementations the described functionality of two or more of the components of the RF unit 902 or the antenna subsystem 920 can be performed by a single component. For example, at least some of the DSP 904, the DAC 906, the PA 908, the diplexer 910, the demodulator 912, the deserializer 914, the diplexer 922, the directional coupler 924, the hybrid switch 926, the ADC 928, the serializer 930, the modulator 932, the clock 934, the antenna controller state machine 936, and the beamforming network 940 can be represented in hardware, such as via an ASIC or an FPGA, or the operations described with reference to some of the elements can be performed by a processor executing computer-readable instructions. For brevity, any combination of the DAC 906, the PA 908, the diplexer 910, the demodulator 912, the deserializer 914, the diplexer 922, the directional coupler 924, the hybrid switch 926, the ADC 928, the serializer 930, the modulator 932, the clock 934, the antenna controller state machine 936, and the beamforming network 940 can be referred to herein as circuitry.

During operation of the radio device 900, the RF unit 902 and the antenna subsystem 920 can perform a loop-back calibration procedure to determine a delay associated with the RF cable 918. During the calibration procedure, the RF unit 902 (e.g., the DSP 904) can generate a digitized calibration signal. Because the digitized calibration signal is to be passed to the antenna subsystem 920 (e.g., after conversion to an RF signal) but not transmitted by the antenna array 950, the digitized calibration signal can be generated with features or characteristics that reduce the complexity or difficulty of processing during a later delay calculation. For example, the range and resolution of the digitized calibration signal can be adapted to perform better with the calibration calculation as compared to an altitude or height calculation performed during a measurement procedure, or the signal structure of the digitized calibration signal can be otherwise optimized to improve calibration performance. After the digitized calibration signal is generated, transmit circuitry of the RF unit 902 (e.g., the DAC 906, the PA 908, the diplexer 910, the first electrical connector 916, or a combination thereof) can output, via the RF cable 918 (e.g., an electrical connector) a calibration RF signal 960 that is based on the digitized calibration signal. For example, the digitized calibration signal may be converted to an RF signal for transmission via the RF cable 918. To further illustrate, the in-phase (I) and quadrature (Q) signals can be processed by the DAC 906 and upconverted in frequency to reside in a frequency band for transmission to the antenna subsystem 920. Because the calibration RF signal 960 is not intended for transmission by the antenna array 950, the calibration RF signal 960 can have a wider bandwidth than an output RF signal 966 that is used during a measurement process, as further described below. For example, the bandwidth of the calibration RF signal 960 may be wider than a 13.25 to 13.4 GHz working band for the output RF signal 966, the bandwidth may be centered at a different frequency, or both. As such, the calibration RF signal 960 can be designed to improve an accuracy of the calibration procedure, instead of using the same signal and waveform of the measurement procedure.

Responsive to transmission of the calibration RF signal 960 by the RF unit 902, receive circuitry of the antenna subsystem 920 (e.g., the second electrical connector 921, the diplexer 922, the directional coupler 924, or a combination thereof) can receive the calibration RF signal 960 via the RF cable 918. For example, the diplexer 922 can pass the calibration RF signal 960 to the directional coupler 924 which directs the calibration RF signal 960 to the hybrid switch 926. The hybrid switch 926 can operate in one of multiple modes that connect different input ports to different output ports based on whether the antenna subsystem 920 is performing the calibration process or measurement process, or another process. For example, if the antenna subsystem 920 is performing a measurement process to determine an altitude or speed of a vehicle, as further described below, the hybrid switch 926 can operate in a first mode to provide an output RF signal 966 received from the directional coupler 924 to the antenna array 950 (e.g., via the beam forming network 940) or in a second mode to provide a return RF signal received from the antenna array 950 to the ADC 928. As another example, if the antenna subsystem 920 is performing the calibration process, the hybrid switch can operate in a third mode to provide the calibration RF signal 960 received from the directional coupler 924 to the ADC 928. Thus, during the calibration procedure, the calibration RF signal 960 is not provided to the antenna array 950 for transmission, and instead passes through the hybrid switch 926 as received by the antenna subsystem 920.

During the calibration procedure, transmit circuitry of the antenna subsystem 920 (e.g., the ADC 928, the serializer 930, the modulator 932, the diplexer 922, or a combination thereof) can sample the calibration RF signal 960 to generate a sampled calibration signal that is output as a first bitstream 962 via the RF cable 918. For example, the ADC 928 can sample the calibration RF signal 960 to generate a sampled calibration signal (e.g., a digitized calibration signal at the antenna subsystem 920), and the serializer 930 can serialize the sampled calibration signal as a bitstream that is modulated onto a carrier waveform by the modulator 932 for transmission to the RF unit 902. To further illustrate, the ADC 928 can down convert the calibration RF signal 960 to baseband such that I and Q samples of the calibration RF signal 960 are taken at baseband to generate the sampled calibration RF signal. Unlike the example described with reference to FIG. 2, the antenna subsystem 920 provides a single signal (e.g., the sampled calibration signal) as a bitstream, instead of a combination of two signals (e.g., sampled output RF and return RF signals). Responsive to transmission of the first bitstream, receive circuitry of the RF unit 902 (e.g., the diplexer 910, the demodulator 912, the deserializer 914, or a combination thereof) can receive the first bitstream 962 via the RF cable 918 and extract the sampled calibration signal from the first bitstream 962. For example, the diplexer 910 can provide the received waveform to the demodulator 912 for demodulation of the first bitstream 962 from the carrier waveform, and the deserializer 914 can deserialize the first bitstream 962 to generate the sampled calibration signal generated by the antenna subsystem 920.

During the calibration procedure, the DSP 904 can determine a time delay 964 associated with the RF cable 918 based on the digitized calibration signal generated at the RF unit 902 and the first bitstream 962 received from the antenna subsystem 920 (e.g., the sampled calibration signal). To illustrate, the DSP 904 can compare the digitized calibration signal to the sampled calibration signal received from the antenna subsystem 920 to determine the time delay 964 between the two signals. Because the sampled calibration signal is based on the digitized calibration signal and is sampled as it is received by the antenna subsystem 920, the time delay 964 between the two signals represents a signal delay caused by communication through the RF cable 918. Once the time delay 964 is determined, the time delay 964 can be stored at the RF unit 902 such that, during performance of a measurement procedure, the RF unit 902 can subtract the time delay 964 from return RF signals received from the antenna subsystem 920 to account for the time delay 964 in the RF cable 918. Because the time delay 964 can be detected and accounted for, the RF cable 918 can have any length instead of one of a set of predefined cable lengths.

The RF unit 902 and the antenna subsystem 920 can perform the calibration procedure once or multiple times depending on a calibration configuration. In some implementations, the calibration procedure is performed at startup of the RF unit 902 and the antenna subsystem 920 (e.g., of one or more processors or processing circuitry such as the DSP 904 and the antenna controller state machine 936). Additionally, or alternatively, the calibration procedure can be performed according to a fixed calibration schedule. For example, the calibration procedure may be performed at periodic time intervals, after a predetermined number of measurement operations, or according to any other fixed schedule. In some other implementations, an initial calibration operation can be performed, and then a less intensive delay estimation procedure can be performed periodically or based on trigger condition(s) to estimate a change to the time delay 964, such as based on temperature, air pressure, other factors, or a combination thereof. In such implementations, the calibration procedure is performed if the delay metric generated during the delay estimation procedure satisfies a threshold. In this manner, the full calibration procedure can be reserved for situations in which the time delay 964 is expected to sufficiently change such that the benefit of updating the calibrated delay value outweighs the time and processing resource usage of performing the calibration procedure.

In some implementations, in addition to performing the loop-back calibration procedure described above, and the measurement procedure described below, the RF unit 902 and the antenna subsystem 920 can perform a load-based calibration procedure to account for one or more conditions at the antenna array 950 that can also affect signal propagation delay between the RF unit 902 and the antenna subsystem 920. The load-based calibration procedure can include comparing, at the DSP 904, a signal from the antenna load 938 and an expected load signal to determine a delay associated with condition(s) at the antenna array 950, and this delay can be similarly subtracted from received signals during the measurement procedure to account for the delay. To illustrate, the antenna load 938 can be coupled to or integrated with the antenna array 950, such that the antenna load 938 experiences the same conditions (e.g., temperature, air pressure, and the like) as the antenna array 950. During the load-based calibration procedure, the RF unit 902 does not provide a signal to the antenna subsystem 920. Instead, the hybrid switch 926 can operate in a fourth mode to connect the antenna load 938 (e.g., as an input) to the ADC 928 (e.g., as an output), and a signal from the antenna load 938 can be sampled and converted into a bitstream that is provided to the RF unit 902. Because the antenna load 938 can be designed to respond to conditions such as temperature in the same manner as the antenna array 950, if such conditions cause thermal noise in signals at the antenna array 950, this thermal noise is also reflected in the signal that is output by the antenna load 938. As such, the DSP 904 can compare the sampled antenna load signal to an expected antenna load signal (e.g., a signal determined at a predetermined temperature or without temperature-dependent thermal noise) to determine a thermal noise (e.g., a noise parameter associated with a surface-mountable antenna module) to account for during performance of the measurement process, similar to the time delay 964 associated with the RF cable 918.

In addition to performing the above-described calibration procedure(s), the RF unit 902 and the antenna subsystem 920 can perform a measurement procedure to transmit and receive RF waveforms from the antenna array 950 and to determine an altitude or a speed of an aircraft or other vehicle, similar to as described above with reference to FIG. 2. To illustrate, during the measurement procedure, the RF unit 902 may send an output RF signal 966 via the RF cable 918 to the antenna subsystem 920, which can receive the output RF signal 966 at the diplexer 922 to route the output RF signal 966 through the directional coupler 924 to the hybrid switch 926. During the measurement procedure, the hybrid switch 926 can be configured in the first mode to couple the input received from the directional coupler 924 to the beamforming network 940 to route the output RF signal 966 to the beamforming network 940 for transmission via the antenna array 950 as one or more antenna beams, and a return RF signal that is responsive to the output RF signal 966 can be received at the antenna array 950. In some implementations, the output RF signal 966 is transmitted by beamforming a plurality of beams via the antenna array 950 according to a beamforming pattern, and each beam of the plurality of beams includes a respective selected waveform from a preset family of waveforms (e.g., a family of waveforms designed to reduce spoofing or jamming, or waveforms designed for enhancing the range or doppler resolution of the signals). The return RF signal may be propagated back to the hybrid switch 926, which can then operate in the second mode to couple the input received from the beam forming network 940 to the ADC 928 to route the return RF signal to the ADC 928 for digitization and sampling. As described above, the ADC 928 can down convert the return RF signal to baseband such that I and Q samples are taken at baseband to generate the sampled, digitized return RF signal. The sampled, digitized return RF signal can be serialized and modulated, by the serializer 930 and the modulator 932, respectively, to generate a second bitstream 968 that is modulated on a carrier waveform and sent via the RF cable 918 to the RF unit 902.

The RF unit 902 can receive and process the second bitstream 968, via the demodulator 912 and the deserializer 914, to extract the sampled return RF signal for use in determining an altitude measurement or indicator, a speed measurement or indicator, or both, as described with reference to FIG. 2, and represented in FIG. 9 as measured data 970. For example, the DSP 904 may compare the digitized output RF signal to the sampled return RF signal, such as via a cross-correlation operation, to determine the altitude and/or the speed (e.g., the measured data 970). In some implementations, the DSP 904 can perform the cross-correlation according to Formula 1 below:

Cross−Correlation Operation $$\text{Correlation} = |x_t(nt_s) * x_r(nt_s)| = \left|x_t^{HT}(nt_s) * x_r(nt_s)\right| \qquad \text{Formula 1}$$

where * denotes correlation, * denotes convolution, and $(\ )^{HT}$ denotes the transpose of the conjugate of a vector. Stated another way, the cross-correlation is a convolution of a reversed and conjugated source signal $x_t(nt_s)$ with the received signal $x_r(nt_s)$.

However, unlike the RF unit 202 of FIG. 2, the RF unit 902 accounts for the time delay 964 in the RF cable 918 without receiving a sampled RF output signal from the antenna subsystem 920. To illustrate, prior to comparing the return RF signal to the output RF signal 966, the RF unit 902 can subtract the time delay 964 determined during the calibration procedure (or otherwise modify the return RF signal) to account for any delay associated with the RF cable 918. As such, performance of the calibration procedure takes the place of the antenna subsystem 920 providing a sampled and digitized version of the output RF signal 966 as received by the antenna subsystem 920, which reduces the amount of circuitry at the antenna subsystem 920 as compared to the antenna subsystem 220 of FIG. 2. For example, the antenna subsystem 920 includes a single ADC (e.g., the ADC 928) and related circuitry instead of multiple ADCs and related circuitry, which can reduce the cost, complexity, and size of the antenna subsystem 920 as compared to the antenna subsystem 220 of FIG. 2.

In some implementations, the RF unit 902 (e.g., the DSP 904) can store data that represents the digitized output RF signal, or values derived therefrom, in the memory 903 (e.g., as the signal data 905), and this information can be retrieved to perform the cross-correlation operation without recalculating the values represented by the signal data 905. Storing the signal data 905 at the memory 903 can replace recalculating the same values when the return RF signal is received from the antenna subsystem 920, which can increase the speed of, and decrease the processing resource utilization associated with, the measurement procedure. For example, the DSP 904 can store samples of the digitized output RF signal that are sampled during generation of the digitized output RF signal as the signal data 905, and the DSP 904 can retrieve these samples for use in performing the cross-correlation operation with the sampled return RF signal. As another example, the cross-correlation operation can include performing one or more fast Fourier transform (FFT) operations on the digitized output RF signal and the sampled return RF signal, and the DSP 904 can generate and store in advance one or more FFT samples based on the digitized output RF signal as the signal data 905. To further illustrate, with reference to Formula 1, the signal data 905 can include the source waveform $x_t(nt_s)$ and FFT samples of the waveform. As such, these values may be ready for use in calculating the cross-correlation when the sampled return RF signal is received by the DSP 904, which can increase the speed of the cross-correlation operation and reduce processor resource utilization in determining the altitude or speed of the vehicle (e.g., the measured data 970).

Because the output RF signal 966 and the calibration RF signal 960 are intended for different purposes (e.g., the output RF signal 966 is to be transmitted via the antenna array 950 but the calibration RF signal 960 is to be passed through the antenna subsystem 920 without external transmission), characteristics of the underlying bit sequences and data associated with the signals may be different between the output RF signal 966 and the calibration RF signal 960. As an example, the output RF signal 966 can be based on a first coded bit sequence and the calibration RF signal 960 can be based on a second coded bit sequence that is different than the first coded bit sequence. To illustrate, the output RF signal 966 can be generated from one of multiple coded bit sequences that are designed and rotated between to reduce spoofing or jamming, and the calibration RF signal 960 can be generated from a different, relatively simple coded bit sequence since the calibration RF signal 960 remains internal to the radio device 900. As another example, the calibration RF signal 960 and the sampled digitized signal can include a representation of a first watermark, and the output RF signal 966 and the digitized return RF signal can include a representation of a second watermark that is different than the first watermark. Similar to as described with reference to the coded bit sequences, because the calibration RF signal 960 is not intended for transmission outside the antenna subsystem 920, the calibration RF signal 960 can include a weaker or less complex watermark (or no watermark) as compared to the output RF signal 966, which may include a watermark that is selected to reduce spoofing or jamming.

Additionally, or alternatively, characteristics of the RF waveforms or the carrier waveforms for bitstreams may be different between the output RF signal 966 and the calibration RF signal 960. As an example, the bandwidth of the calibration RF signal 960 can be a first bandwidth that is different than a second bandwidth of the output RF signal 966. To illustrate, because the calibration RF signal 960 is not intended for transmission outside the antenna subsystem 920, the calibration RF signal 960 can have a bandwidth that is greater than a bandwidth of a particular frequency band associated with the output RF signal 966. As another example, the antenna subsystem 920 can modulate the first bitstream 962 (e.g., the bitstream that includes the sampled calibration RF signal) at a first frequency, and the antenna subsystem 920 can modulate the second bitstream 968 (e.g., the bitstream that includes the sampled return RF signal) at a second frequency that is different than the first frequency. To illustrate, similar to the bandwidth of the calibration RF signal 960, the carrier waveform that carries the first bitstream 962 (e.g., the sampled calibration RF signal) is not restricted by any criteria associated with the carrier waveform that carries the second bitstream 968 (e.g., the return RF signal).

In some implementations, the radio device 900 includes an RF unit (e.g., the RF unit 902) that includes first transmit circuitry (e.g., the DAC 906, the PA 908, the diplexer 910, and the first electrical connector 916), first receive circuitry (e.g., the first electrical connector 916, the demodulator 912, and the deserializer 914), and a processing unit (e.g., the DSP 904). The first transmit circuitry is configured to output, via an electrical connector (e.g., the RF cable 918) during a calibration procedure, a calibration RF signal (e.g., the calibration RF signal 960) based on a digitized calibration signal. The first receive circuitry is configured to receive, via the electrical connector during the calibration procedure, a first bitstream (e.g., the first bitstream 962) representing a sampled calibration signal. The processing unit is configured to determine a time delay (e.g., the time delay 964) associated with the electrical connector based on the digitized calibration signal and the first bitstream. The radio device 900 also includes a surface-mountable antenna module (e.g., the antenna subsystem 920) configured to be coupled to the RF unit via the electrical connector. The surface-mountable antenna module includes a housing, second receive circuitry (e.g., the second electrical connector 921, the diplexer 922, and the directional coupler 924), and second transmit circuitry (e.g., the ADC 928, the serializer 930, the modulator 932, the diplexer 922, and the second electrical connector 921). The housing is configured to mount to an external surface of a vehicle. The second receive circuitry is configured to receive, via the electrical connector during the calibration procedure, the calibration RF signal. The second transmit circuitry is configured to, during the calibration procedure, sample the calibration RF signal to generate the sampled calibration signal and output, via the electrical connector, the sampled calibration signal as the first bitstream.

Figure 10:
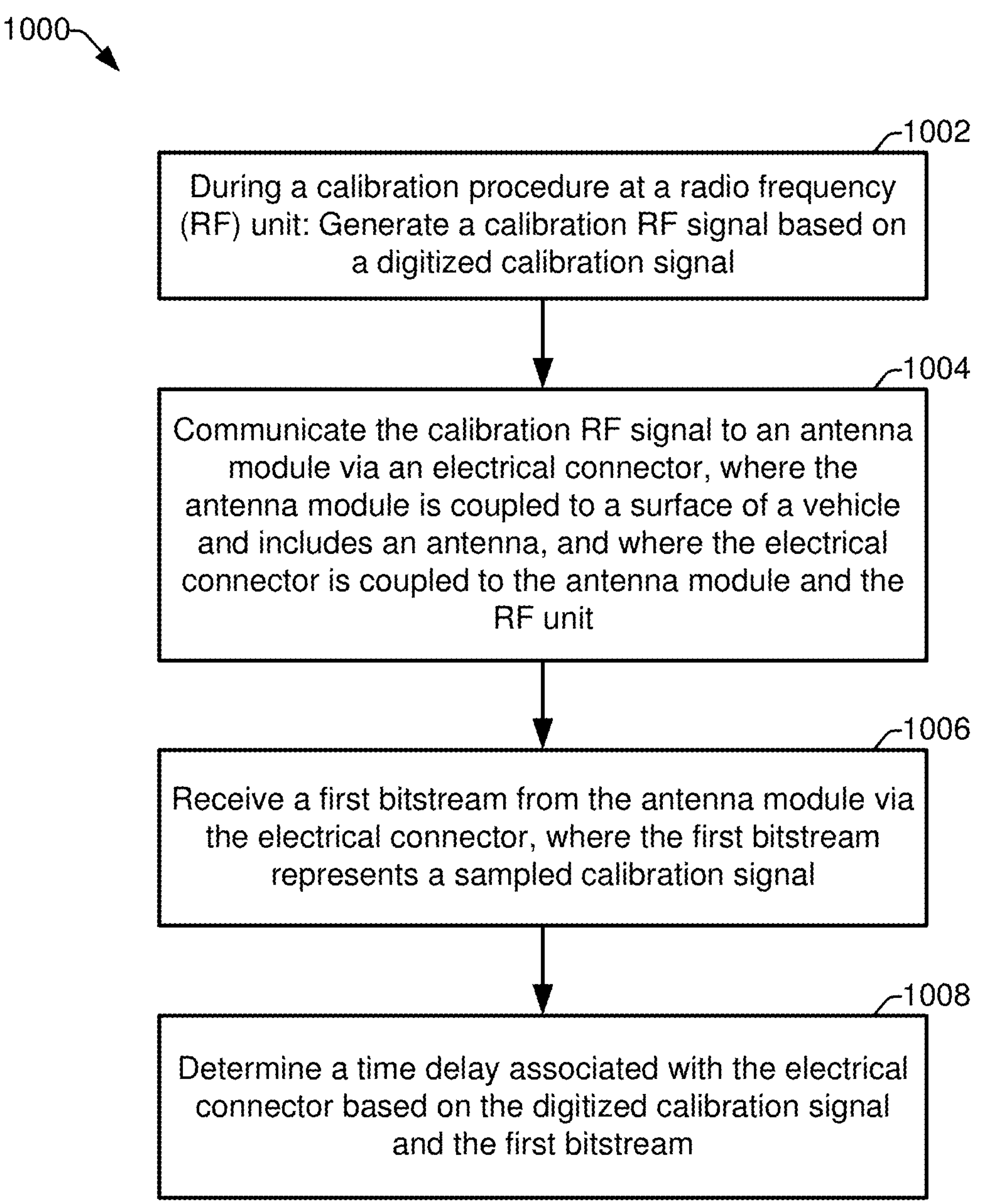
FIG. 10 is a diagram that illustrates a flow chart of an example of a method of calibrating a radio device that includes a surface-mountable antenna array according to one or more aspects of the present disclosure.

FIG. 10 is a flowchart that illustrates an example of a method 1000 of calibrating a radio device that includes a surface-mountable antenna array according to one or more aspects of the present disclosure. The radio device can provide radio altimeter functionality, Doppler radar functionality, or a combination of radio altimeter functionality and Doppler radar functionality. The method 1000 can be initiated, performed, or controlled by one or more processors executing instructions, or by circuitry configured to cause performance of one or more operations, such as resides within the RF unit 102 of FIG. 1, the RF unit 902 of FIG. 9, or a combination thereof.

In some implementations, the method 1000 includes, at block 1002 and during a calibration procedure at an RF unit, generating a calibration RF signal based on a digitized calibration signal. For example, the calibration RF signal can include or correspond to the calibration RF signal 960 of FIG. 9, and the RF unit can include or correspond to the RF unit 902 of FIG. 9. The method 1000 includes, at block 1004 and during the calibration procedure, communicating the calibration RF signal to an antenna module via an electrical connector. The antenna module is coupled to a surface of a vehicle and includes an antenna, and the electrical connector is coupled to the antenna module and the RF unit. For example, the antenna module can include or correspond to the antenna subsystem 920 of FIG. 9, and the electrical connector can include the RF cable 918 of FIG. 9.

The method 1000 includes, at block 1006 and during the calibration procedure, receiving a first bitstream from the antenna module via the electrical connector. The first bitstream represents a sampled calibration signal. For example, the first bitstream can include or correspond to the first bitstream 962 of FIG. 9. The method 1000 also includes, at block 1008 and during the calibration procedure, determining a time delay associated with the electrical connector based on the digitized calibration signal and the first bitstream. For example, the time delay can include or correspond to the time delay 964 of FIG. 9.

In some implementations, the method 1000 also includes, during a measurement procedure at the RF unit, generating an output RF signal based on a digitized RF signal and communicating the output RF signal to the antenna module via the electrical connector. For example, the output RF signal can include or correspond to the output RF signal 966 of FIG. 9. In such implementations, the method 1000 further includes, during the measurement procedure, receiving a second bitstream from the antenna module via the electrical connector, the second bitstream representing a digitized return signal, and generating an altitude indication for the vehicle, a speed indication for the vehicle, or a combination thereof, based on the digitized RF signal, the second bitstream, and the time delay. For example, the second bitstream can include or correspond to the second bitstream 968 of FIG. 9, and the altitude indication, the speed indication, or both, can include or correspond to the measured data 970 of FIG. 9. In some such implementations, generating the altitude indication, the speed indication, or both further includes generating an adjusted return signal based on the second bitstream and the time delay and calculating a correlation between the digitized RF signal and the adjusted return signal. The altitude indication, the speed indication, or both, are based on the correlation. For example, the DSP 904 can perform the cross-correlation operation according to Formula 1 based on the output RF signal and the return RF signal extracted from the second bitstream 968 after the time delay 964 is subtracted from the return RF signal.

In some implementations, the method 1000 also includes performing the calibration procedure at startup of one or more processors that perform the calibration procedure or according to a fixed calibration schedule. For example, the DSP 904 of FIG. 9 can perform the calibration procedure upon startup of the DSP 904 and the antenna controller state machine 936 (e.g., the RF unit 902 and the antenna subsystem 920) or according to any type of fixed calibration schedule described with reference to FIG. 9. Additionally, or alternatively, the method 1000 can further include performing a periodic delay measurement procedure to generate a delay metric associated with the electrical connector and performing the calibration procedure based on the delay metric satisfying a threshold. For example, the DSP 904 of FIG. 9 can perform a faster and less computationally intensive delay estimation procedure to estimate a delay metric, and if the delay metric satisfies a threshold, the DSP 904 can initiate performance of the calibration procedure.

Figure 11:
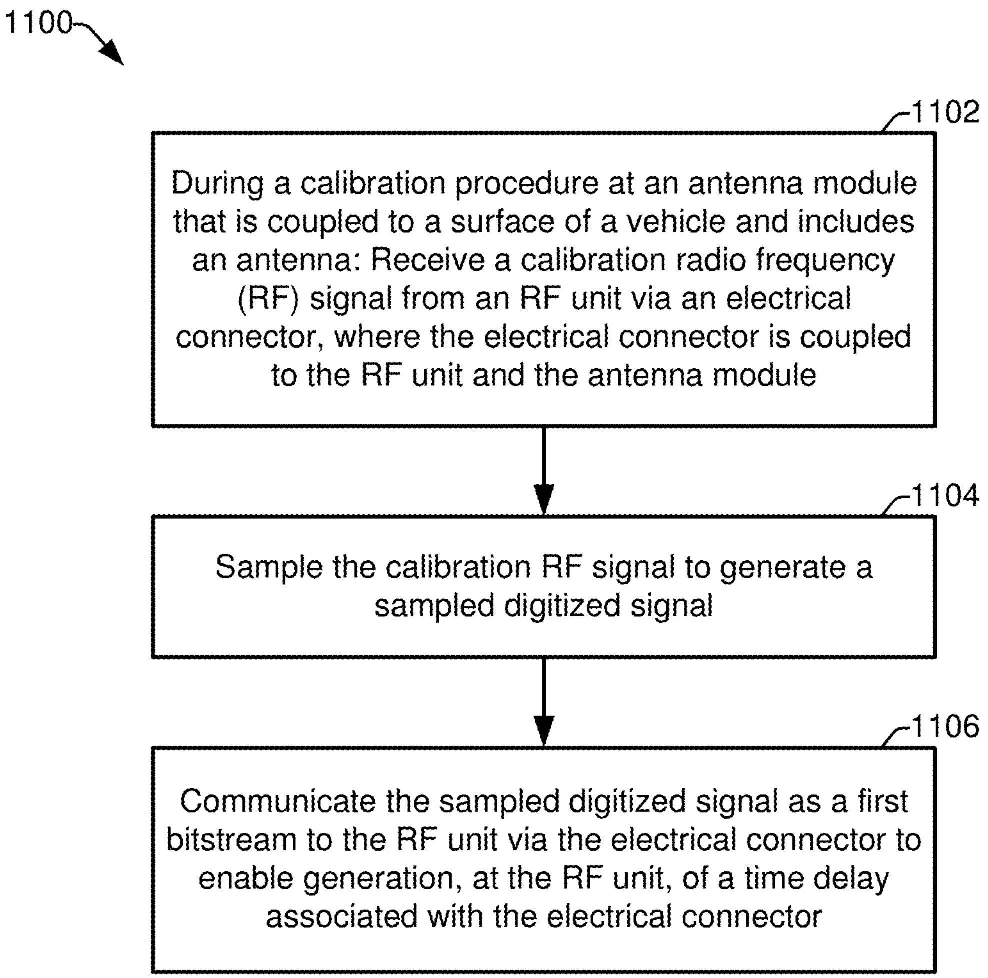
FIG. 11 is a diagram that illustrates a flow chart of an example of a method of supporting calibration of a radio device that includes a surface-mountable antenna array according to one or more aspects of the present disclosure.

FIG. 11 is a flowchart that illustrates an example of a method 1100 of supporting calibration of a radio device that includes a surface-mountable antenna array according to one or more aspects of the present disclosure. The radio device can provide radio altimeter functionality, Doppler radar functionality, or a combination of radio altimeter functionality and Doppler radar functionality. The method 1100 can be initiated, performed, or controlled by one or more processors executing instructions, or by circuitry configured to cause performance of one or more operations, such as resides within surface-mountable antenna module 104 of FIG. 1, the antenna subsystem 920 of FIG. 9, or a combination thereof.

In some implementations, the method 1100 includes, at block 1102 and during a calibration procedure at an antenna module that is coupled to a surface of a vehicle and includes an antenna, receiving a calibration RF signal from an RF unit via an electrical connector. The electrical connector is coupled to the RF unit and the antenna module. For example, the antenna module can include or correspond to the antenna subsystem 920 of FIG. 9, the electrical connector can include or correspond to the RF cable 918 of FIG. 9, and the calibration RF signal can include or correspond to the calibration RF signal 960 of FIG. 9.

The method 1100 includes, at block 1104 and during the calibration procedure, sampling the calibration RF signal to generate a sampled digitized signal. For example, the calibration RF signal 960 of FIG. 9 can be provided to the hybrid switch 926, which routes the calibration RF signal 960 to the ADC 928 for sampling during the calibration procedure. The method 1100 also includes, at block 1106 and during the calibration procedure, communicating the sampled digitized signal as a first bitstream to the RF unit via the electrical connector to enable generation, at the RF unit, of a time delay associated with the electrical connector. For example, the first bitstream can include or correspond to the first bitstream 962 of FIG. 9.

In some implementations, the method 1100 also includes, during a measurement procedure at the surface-mountable antenna module, receiving an output RF signal, transmitting the output RF signal via an antenna, and receiving a return RF signal via the antenna based on the transmission of the output RF signal. For example, the hybrid switch 926 can provide the output RF signal 966 to the beamforming network 940 and the antenna array 950 for transmission by the antenna array 950, and a return RF signal received by the antenna array 950 can be passed by the hybrid switch 926 to the ADC 928. In such implementations, the method 1100 further includes generating a digitized return signal based on the return RF signal and communicating the digitized return signal as a second bitstream to the RF unit via the electrical connector to enable generation, at the RF unit, of an altitude measurement for the vehicle, a speed measurement for the vehicle, or a combination thereof, based on the second bitstream and the time delay. For example, the second bitstream can include or correspond to the second bitstream

968 of FIG. 9, and the altitude measurement, the speed measurement, or both, can include or correspond to the measured data 970 of FIG. 9.

In some implementations in which the second bitstream 968 is generated, the method 1100 also includes modulating the first bitstream or the second bitstream onto a carrier waveform at a first frequency that is different than a second frequency associated with the output RF signal. For example, the first bitstream 962 or the second bitstream 968 of FIG. 9 can be modulated onto respective carrier waveforms that are outside the working band associated with the output RF signal 966. Additionally, or alternatively, the calibration RF signal and the sampled digitized signal include a representation of a first watermark and the output RF signal and the digitized return signal include a representation of a second watermark that is different than the first watermark. The calibration RF signal 960 of FIG. 9 and the sampled digitized signal represented by the first bitstream 962 can include a first representation of a watermark, and the output RF signal 966 and the sampled, digitized return RF signal included in the second bitstream 968 can include a representation of a second watermark that is different than the first watermark. Additionally, or alternatively, transmitting the output RF signal can include beamforming a plurality of beams via an antenna array according to a beamforming pattern. Each beam of the plurality of beams includes a respective selected waveform from a preset family of waveforms. For example, the preset family of waveforms can be created to avoid spoofing or jamming, or to improve performance of a particular type of measurement that is based on the selected waveform, as described above with reference to FIG. 9.

The methods described above with reference to FIGS. 10 and 11 can be implemented to realize one or more of the technical advantages described in more detail above. For example, the methods 1000 and 1100 can enable calibration of a device having radio altimeter functionality and Doppler radar functionality regardless of a length of an electrical connector between components of the device. As such, the methods 1000 and 1100 can account for delay caused by an electrical connector, such as an RF cable, without requiring multiple ADCs to be integrated in a surface-mountable antenna module.

Figure 12:
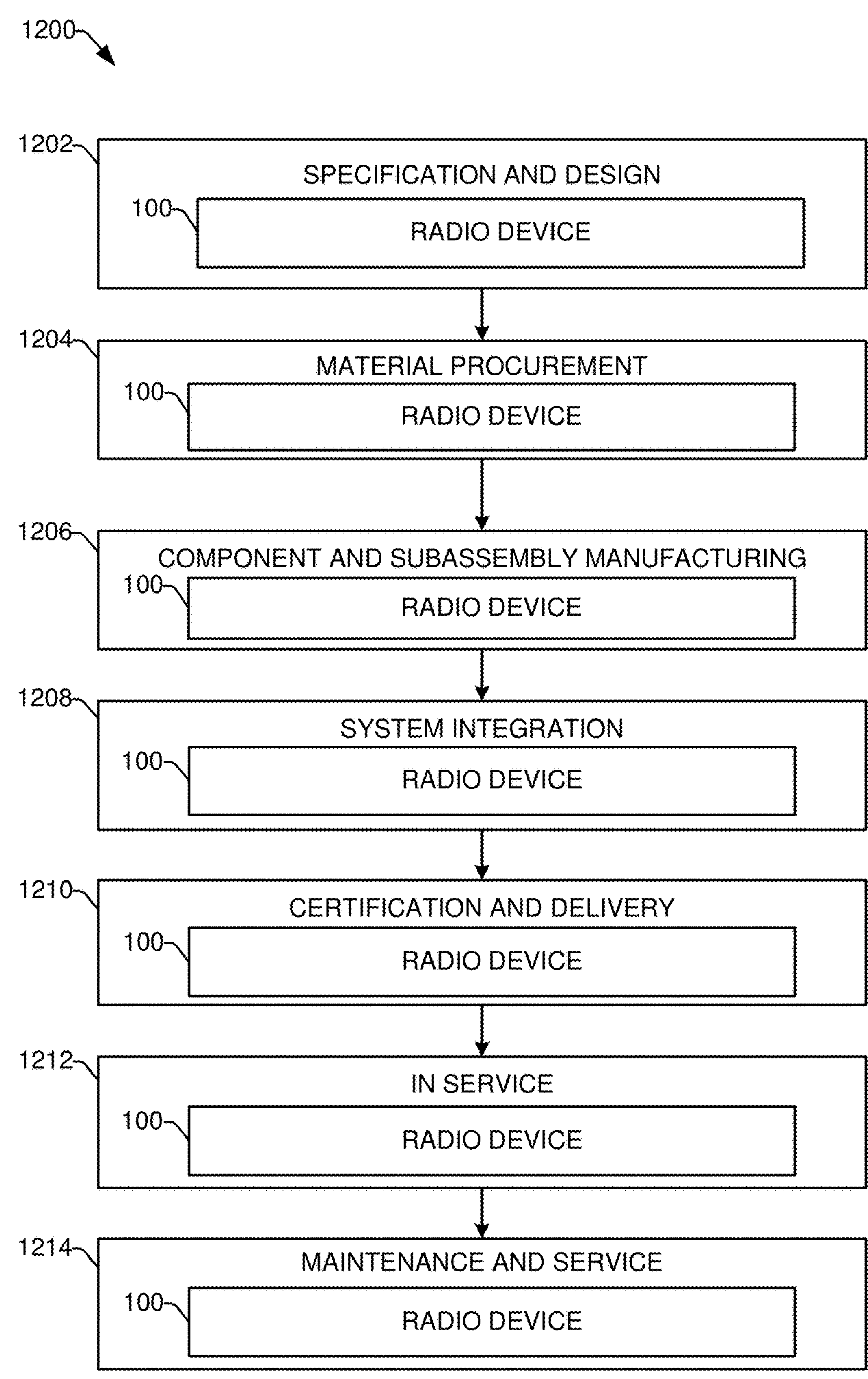
FIG. 12 is a flowchart illustrating an example of a life cycle of an aircraft including a radio device that includes a surface-mountable antenna module according to one or more aspects of the present disclosure.

Referring to FIG. 12, a flowchart illustrative of an example of a life cycle of an aircraft that includes a radio device that includes a surface-mountable antenna module is shown and designated 1200. The radio device can provide radio altimeter functionality, Doppler radar functionality, or a combination of radio altimeter functionality and Doppler radar functionality, and the radio device can support a loop-back calibration process to account for delay associated with cabling between elements of the radio device. During pre-production, the exemplary method 1200 includes, at 1202, specification and design of an aircraft, such as the aircraft 502 described with reference to FIG. 5. During specification and design of the aircraft, the method 1200 can include specification and design of the radio device that is configured to provide radio altimeter functionality, Doppler radar functionality, or both, and that supports a loop-back calibration process. At 1204, the method 1200 includes material procurement, which can include procuring materials for the radio device.

During production, the method 1200 includes, at 1206, component and subassembly manufacturing and, at 1208, system integration of the aircraft. For example, the method 1200 can include component and subassembly manufacturing of the radio device and system integration of the radio device. At 1210, the method 1200 includes certification and delivery of the aircraft and, at 1212, placing the aircraft in service. Certification and delivery can include certification of the radio device to place the radio device in service. While in service by a customer, the aircraft can be scheduled for routine maintenance and service (which can also include modification, reconfiguration, refurbishment, and so on). At 1214, the method 1200 includes performing maintenance and service on the aircraft, which can include performing maintenance and service on the radio device. Alternatively, performing maintenance and service on the aircraft can include replacing a radio altimeter with a radio device of the present disclosure during a retrofit operation.

Each of the processes of the method 1200 can be performed or carried out by a system integrator, a third party, and/or an operator (e.g., a customer). For the purposes of this description, a system integrator can include without limitation any number of aircraft manufacturers and major-system subcontractors; a third party can include without limitation any number of venders, subcontractors, and suppliers; and an operator can be an airline, leasing company, military entity, service organization, and so on.

Figure 13:
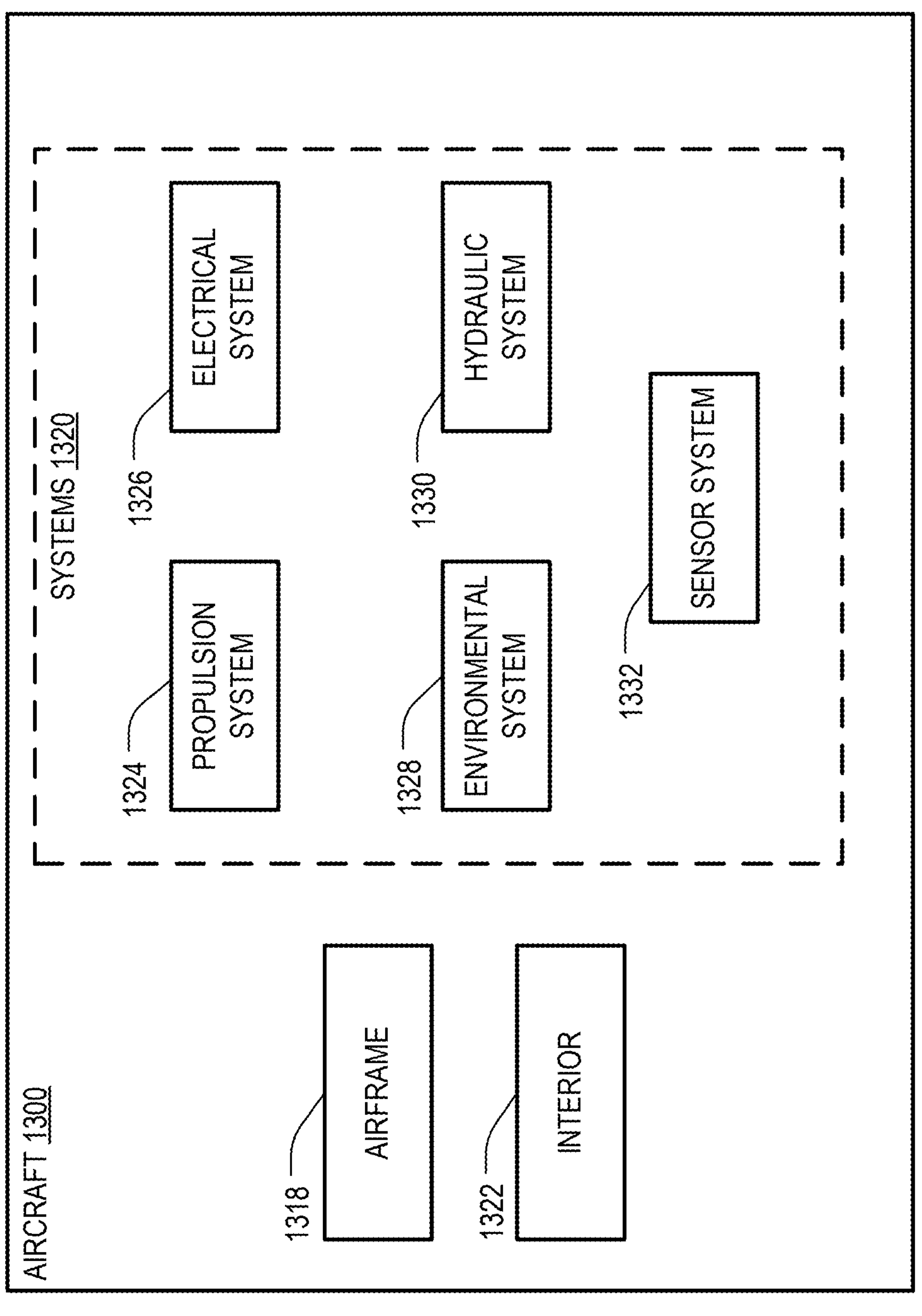
FIG. 13 is a block diagram of a particular implementation of the aircraft associated with the life cycle of FIG. 12.

Aspects of the disclosure can be described in the context of an example of a vehicle. A particular example of a vehicle is an aircraft 1300 as shown in FIG. 13. In the example of FIG. 13, the aircraft 1300 includes an airframe 1318 with a plurality of systems 1320 and an interior 1322. Examples of the plurality of systems 1320 include one or more of a propulsion system 1324, an electrical system 1326, an environmental system 1328, a hydraulic system 1330, and a sensor system 1332. Any number of other systems can be included. In the example of FIG. 13, the sensor system 1332 includes a radio device that is configured to provide radio altimeter functionality and/or Doppler radar functionality and that includes a surface-mountable antenna array that supports a loop-back calibration process, such as the radio device 100 of FIG. 1, a radio device that includes the surface-mountable antenna array 300 of FIG. 3, a radio device that includes the system 400 of FIG. 4, the radio device used by the aircraft 502 of FIG. 5, the radio device 600 of FIG. 6, the radio device 900 of FIG. 9, the radio device included in the aircraft associated with the method 1200 of FIG. 12, or any combination thereof.

Figure 14:
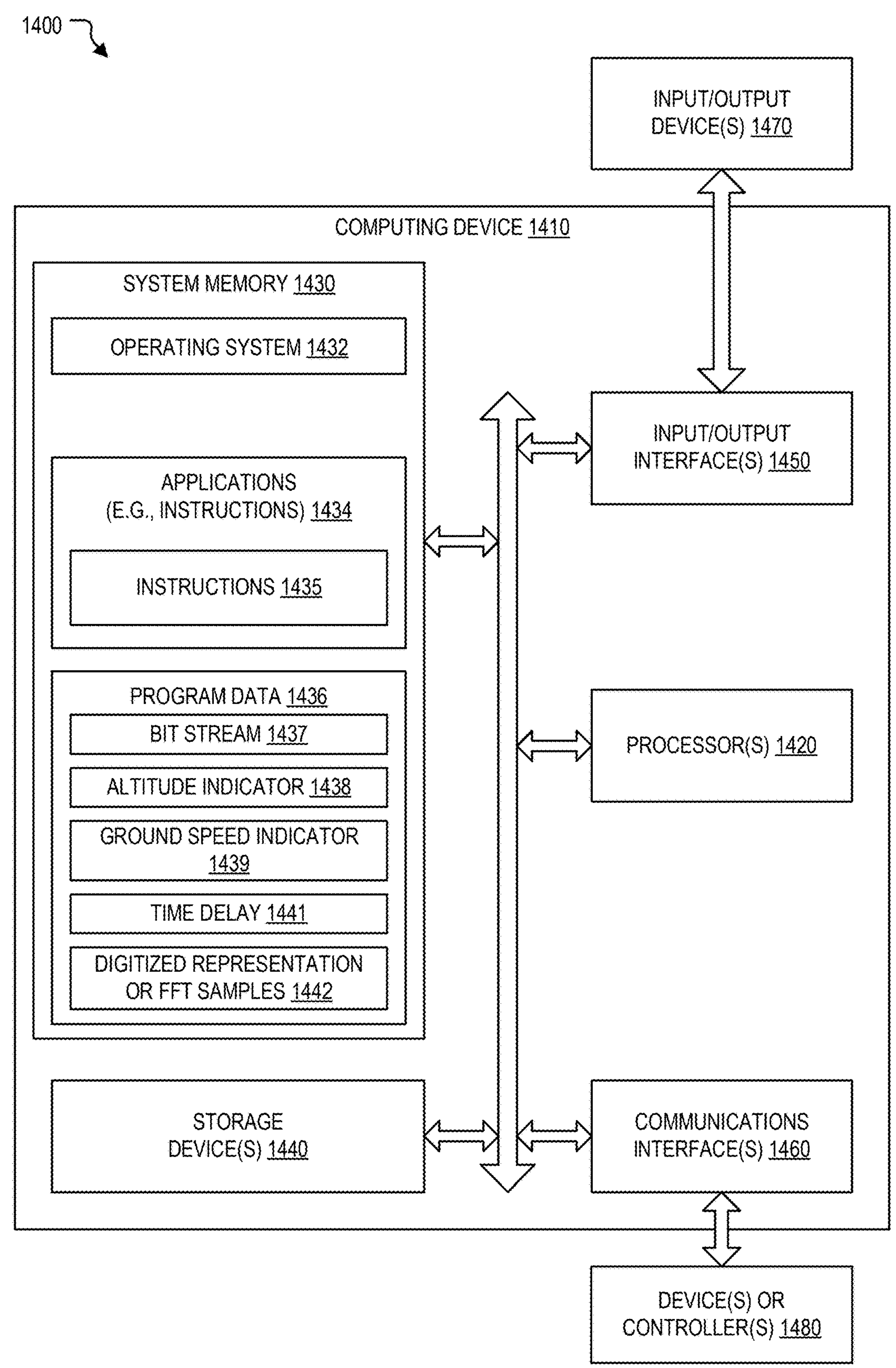
FIG. 14 is a block diagram of a computing environment including a computing device configured to support aspects of computer-implemented methods and computer-executable program instructions (or code) according to the present disclosure.

FIG. 14 is a block diagram of a computing environment 1400 including a computing device 1410 configured to support aspects of computer-implemented methods and computer-executable program instructions (or code) according to the present disclosure. For example, the computing device 1410, or portions thereof, is configured to execute instructions to initiate, perform, or control one or more operations described with reference to FIGS. 1-13.

The computing device 1410 includes one or more processors 1420. The processor(s) 1420 are configured to communicate with system memory 1430, one or more storage devices 1440, one or more input/output interfaces 1450, one or more communications interfaces 1460, or any combination thereof. The system memory 1430 includes volatile memory devices (e.g., random access memory (RAM) devices), nonvolatile memory devices (e.g., read-only memory (ROM) devices, programmable read-only memory, and flash memory), or both. The system memory 1430 stores an operating system 1432, which can include a basic input/output system for booting the computing device 1410 as well as a full operating system to enable the computing device 1410 to interact with users, other programs, and other devices. The system memory 1430 stores system (program) data 1436, such as a bit stream 1437, an altitude indicator 1438, a ground speed indicator 1439, a time delay 1441, a digitized representation or FFT samples 1442, or a combination thereof. The bit stream 1437 may include or correspond to the bit stream communicated between the RF unit 102 and the surface-mountable antenna module 104 of FIG. 1, the first bitstream communicated between the RF unit 902 and the antenna subsystem 920 of FIG. 9, or the second bitstream communicated between the RF unit 902 and the antenna subsystem 920 of FIG. 9. The altitude indicator 1438 may include or correspond to an altitude indicator generated by the RF unit 102 of FIG. 1 or the RF unit 902 of FIG. 9. The ground speed indicator 1439 may include or correspond to a ground speed indicator generated by the RF unit 102 of FIG. 1 or the RF unit 902 of FIG. 9. The time delay 1441 can include or correspond to a time delay determined by the RF unit 102 of FIG. 1 or the RF unit 902 of FIG. 9. The digitized representation or FFT samples 1442 can include or correspond to a representation of a digitized output signal or one or more FFT samples based on the digitized output signal that are generated by the RF unit 102 of FIG. 1 or the RF unit 902 of FIG. 9.

The system memory 1430 includes one or more applications 1434 (e.g., sets of instructions) executable by the processor(s) 1420. As an example, the one or more applications 1434 include instructions executable by the processor(s) 1420 to initiate, control, or perform one or more operations described with reference to FIGS. 1-14. To illustrate, the one or more applications 1434 include instructions 1435 executable by the processor(s) 1420 to initiate, control, or perform one or more operations described with reference to the RF unit 102, the circuitry of the surface-mountable antenna module 104, or a combination thereof.

In a particular implementation, the system memory 1430 includes a non-transitory, computer readable medium storing the instructions 1435 that, when executed by the processor(s) 1420, cause the processor(s) 1420 to initiate, perform, or control operations to perform radio altimeter functionality, Doppler radar functionality, or both, and to support a loop-back calibration procedure. The operations include generating, during a calibration procedure, a calibration RF signal based on a digitized calibration signal. The operations also include communicating, during the calibration procedure, the calibration RF signal to an antenna module via an electrical connector. The antenna module is coupled to a surface of a vehicle and includes an antenna. The electrical connector is coupled to the antenna module and the RF unit. The operations include receiving, during the calibration procedure, a first bitstream from the antenna module via the electrical connector. The first bitstream represents a sampled calibration signal. The operations further include determining, during the calibration procedure, a time delay associated with the electrical connector based on the digitized calibration signal and the first bitstream.

In the same or alternative particular implementations, the system memory 1430 includes a non-transitory, computer readable medium (e.g., a computer-readable storage device) storing the instructions 1435 that, when executed by the processor(s) 1420, cause the processor(s) 1420 to initiate, perform, or control operations to perform radio altimeter functionality, Doppler radar functionality, or both, and to support a loop-back calibration procedure. The operations include receiving, during a calibration procedure at an antenna module that is coupled to a surface of a vehicle and includes an antenna, a calibration RF signal from an RF unit via an electrical connector. The electrical connector is coupled to the RF unit and the antenna module. The operations also include sampling, during the calibration procedure, the calibration RF signal to generate a sampled digitized signal. The operations also include communicating, during the calibration procedure, the sampled digitized signal as a first bitstream to the RF unit via the electrical connector to enable generation, at the RF unit, of a time delay associated with the electrical connector.

The one or more storage devices 1440 include nonvolatile storage devices, such as magnetic disks, optical disks, or flash memory devices. In a particular example, the storage devices 1440 include both removable and non-removable memory devices. The storage devices 1440 are configured to store an operating system, images of operating systems, applications (e.g., one or more of the applications 1434), and program data (e.g., the system program data 1436). In a particular aspect, the system memory 1430, the storage devices 1440, or both, include tangible computer-readable media. In a particular aspect, one or more of the storage devices 1440 are external to the computing device 1410.

The one or more input/output interfaces 1450 enable the computing device 1410 to communicate with one or more input/output devices 1470 to facilitate user interaction. For example, the one or more input/output interfaces 1450 can include a display interface, an input interface, or both. For example, the input/output interface 1450 is adapted to receive input from a user, to receive input from another computing device, or a combination thereof. In some implementations, the input/output interface 1450 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1470 includes one or more user interface devices and displays, including some combination of buttons, keyboards, pointing devices, displays, speakers, microphones, touch screens, and other devices.

The processor(s) 1420 are configured to communicate with devices or controllers 1480 via the one or more communications interfaces 1460. For example, the one or more communications interfaces 1460 can include a network interface. The devices or controllers 1480 can include, for example, a controller for the surface-mountable antenna module 104, one or more other devices, or any combination thereof.

In conjunction with the described systems and methods, an apparatus for measuring an altitude and/or ground speed of a vehicle and that supports a loop-back calibration procedure is disclosed that includes means for generating, during a calibration procedure, a calibration RF signal based on a digitized calibration signal. In some implementations, the means for generating corresponds to the RF unit 102, the RF unit 902, the DSP 904, one or more other circuits or devices configured to generate a calibration RF signal based on a digitized calibration signal, or a combination thereof.

The apparatus also includes means for communicating, during the calibration procedure, the calibration RF signal to an antenna module via an electrical conductor. For example, the means for communicating can correspond to the RF unit 102, the RF unit 902, the DAC 906, the PA 908, the diplexer 910, one or more other circuits or devices configured to communicate a calibration RF signal, or a combination thereof.

The apparatus also includes means for receiving, during the calibration procedure, a first bit stream from the antenna module via the electrical connector. For example, the means for receiving can correspond to the RF unit 102, the RF unit 902, the diplexer 910, the demodulator 912, the deserializer 914, one or more other circuits or devices configured to receive a bit stream, or a combination thereof. The first bit stream represents a sampled calibration signal (e.g., the calibration RF signal that is sampled by the antenna module).

The apparatus also includes means for determining, during the calibration procedure, a time delay associated with the electrical connector based on the digitized calibration signal and the first bitstream. For example, the means for determining can correspond to the RF unit 102, the RF unit 902, the DSP 904, one or more other circuits or devices configured to determine a time delay associated with an electrical connector based on a digitized calibration signal and a bitstream, or a combination thereof.

In the same or alternate implementations, an apparatus for measuring an altitude and/or ground speed of a vehicle and that supports a loop-back calibration procedure is disclosed that includes means for receiving, during a calibration procedure, a calibration RF signal from an RF unit via an electrical connector. In some implementations, the means for receiving corresponds to the surface-mountable antenna module 104, the antenna subsystem 920, the diplexer 922, the directional coupler 924, the hybrid switch 926, the surface-mountable antenna array 504, the surface-mountable antenna array 602, one or more other circuits or devices configured to receive a calibration RF signal, or a combination thereof.

The apparatus also includes means for sampling, during the calibration procedure, the calibration RF signal to generate a sampled digitized signal. For example, the means for sampling can correspond to the surface-mountable antenna module 104, the antenna subsystem 920, the ADC 928, the surface-mountable antenna array 504, the surface-mountable antenna array 602, the circuitry layer 612, one or more other circuits or devices configured to sample a calibration RF signal to generate a sampled digitized signal, or a combination thereof.

The apparatus also includes means for communicating, during the calibration procedure, the sampled digitized signal as a first bitstream to the RF unit via the electrical connector to enable generation, at the RF unit, of a time delay associated with the electrical connector. For example, the means for communicating can correspond to the surface-mountable antenna module 104, the antenna subsystem 920, the serializer 930, the modulator 932, the diplexer 922, the surface-mountable antenna array 504, the surface-mountable antenna array 602, the circuitry layer 612, one or more other circuits or devices configured to communicate a sampled digitized signal as a bit stream, or a combination thereof.

In some implementations, a non-transitory, computer readable medium stores instructions that, when executed by one or more processors, cause the one or more processors to initiate, perform, or control operations to perform part or all of the functionality described above. For example, the instructions can be executable to implement one or more of the operations or methods of FIGS. 1-14. In some implementations, part or all of one or more of the operations or methods of FIGS. 1-14 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

Further, the disclosure comprises embodiments according to the following examples:

According to Example 1, a radio device includes a radio frequency (RF) unit including: first transmit circuitry configured to output, via an electrical connector during a calibration procedure, a calibration RF signal based on a digitized calibration signal; first receive circuitry configured to receive, via the electrical connector during the calibration procedure, a first bitstream representing a sampled calibration signal; and a processing unit configured to determine a time delay associated with the electrical connector based on the digitized calibration signal and the first bitstream. The radio device also includes a surface-mountable antenna module configured to be coupled to the RF unit via the electrical connector. The surface-mountable antenna module includes: a housing configured to mount to an external surface of a vehicle; second receive circuitry configured to receive, via the electrical connector during the calibration procedure, the calibration RF signal; and second transmit circuitry configured to, during the calibration procedure: sample the calibration RF signal to generate the sampled calibration signal; and output, via the electrical connector, the sampled calibration signal as the first bitstream, Example 2 includes the radio device of Example 1, wherein: the first transmit circuitry is further configured to output, via the electrical connector during a measurement procedure, an output RF signal based on a digitized output signal; the first receive circuitry is further configured to receive, via the electrical connector during the measurement procedure, a second bitstream representing a digitized return signal; and the processing unit is further configured to determine an altitude measurement for the vehicle, a speed measurement for the vehicle, or a combination thereof, based on the digitized output signal, the second bitstream, and the time delay.

Example 3 includes the radio device of Example 2, wherein: the second receive circuitry is further configured to receive, via the electrical connector during the measurement procedure, the output RF signal; the surface-mountable antenna module further includes an antenna configured to, during the measurement procedure, transmit the output RF signal and receive a return RF signal based on transmission of the output RF signal; and the second transmit circuitry is further configured to: generate the digitized return signal based on the return RF signal; and output, via the electrical connector, the digitized return signal as the second bitstream.

Example 4 includes the radio device of Example 3, wherein the second transmit circuitry includes: an analog-to-digital converter (ADC); and a switch coupled to the second receive circuitry, the antenna, and the ADC; and the switch is configured to: in a first mode, provide the output RF signal to the antenna; in a second mode, provide the return RF signal to the ADC; and in a third mode, provide the calibration RF signal to the ADC.

Example 5 includes the radio device of Example 4, wherein: the surface-mountable antenna module further includes an antenna load; the switch is further configured to, in a fourth mode, couple the antenna load to the ADC to cause the surface-mountable antenna module to output, via the electrical connector, a load signal as a third bitstream; and the processing unit is further configured to analyze the third bitstream to determine a parameter associated with the surface-mountable antenna module.

Example 6 includes the radio device of any of Examples 3 to 5, wherein the antenna includes an antenna array.

Example 7 includes the radio device of Example 6, wherein: the surface-mountable antenna module further includes a beamformer coupled to the antenna array; and the beamformer is configured to form a plurality of beams according to a beamforming pattern.

Example 8 includes the radio device of any of Examples 2 to 7, wherein: the RF unit further includes a memory configured to store a representation of the digitized output signal, one or more fast Fourier transform (FFT) samples based on the digitized output signal, or a combination thereof; and the processing unit is further configured to determine the altitude measurement, the speed measurement, or a combination thereof, based on the representation of the digitized output signal, the one or more FFT samples, or a combination thereof, the second bitstream, and the time delay.

Example 9 includes the radio device of any of Examples 2 to 8, wherein the calibration RF signal has a wider bandwidth than the output RF signal.

Example 10 includes the radio device of any of Examples 2 to 9, wherein: the output RF signal is based on a first coded bit sequence; and the calibration RF signal is based on a second coded bit sequence that is different than the first coded bit sequence.

Example 11 includes the radio device of any of Examples 1 to 10, wherein the electrical connector includes a coaxial cable connector.

Example 12 includes the radio device of any of Examples 1 to 11, wherein the vehicle is an aircraft.

According to Example 13, a method includes, during a calibration procedure at a radio frequency (RF) unit: generating a calibration RF signal based on a digitized calibration signal; communicating the calibration RF signal to an antenna module via an electrical connector, wherein the antenna module is coupled to a surface of a vehicle and includes an antenna, and wherein the electrical connector is coupled to the antenna module and the RF unit; receiving a first bitstream from the antenna module via the electrical connector, wherein the first bitstream represents a sampled calibration signal; and determining a time delay associated with the electrical connector based on the digitized calibration signal and the first bitstream.

Example 14 includes the method of Example 13, further including, during a measurement procedure at the RF unit: generating an output RF signal based on a digitized RF signal; communicating the output RF signal to the antenna module via the electrical connector; receiving a second bitstream from the antenna module via the electrical connector, wherein the second bitstream represents a digitized return signal; and generating an altitude indication for the vehicle, a speed indication for the vehicle, or a combination thereof, based on the digitized RF signal, the second bitstream, and the time delay.

Example 15 includes the method of Example 14, wherein said generating the altitude indication, the speed indication, or both, includes: generating an adjusted return signal based on the second bitstream and the time delay; and calculating a correlation between the digitized RF signal and the adjusted return signal, wherein the altitude indication, the speed indication, or both, are based on the correlation.

Example 16 includes the method of any of Examples 13 to 15, further including performing the calibration procedure at startup of one or more processors that perform the calibration procedure or according to a fixed calibration schedule.

Example 17 includes the method of any of Examples 13 to 16, further including: performing a periodic delay measurement procedure to generate a delay metric associated with the electrical connector; and performing the calibration procedure based on the delay metric satisfying a threshold.

According to Example 18, a method includes, during a calibration procedure at an antenna module that is coupled to a surface of a vehicle and includes an antenna: receiving a calibration radio frequency (RF) signal from an RF unit via an electrical connector, wherein the electrical connector is coupled to the RF unit and the antenna module; sampling the calibration RF signal to generate a sampled digitized signal; and communicating the sampled digitized signal as a first bitstream to the RF unit via the electrical connector to enable generation, at the RF unit, of a time delay associated with the electrical connector.

Example 19 includes the method of Example 18, further including, during a measurement procedure at the antenna module: receiving an output RF signal; transmitting the output RF signal via an antenna; receiving a return RF signal via the antenna based on the transmission of the output RF signal; generating a digitized return signal based on the return RF signal; and communicating the digitized return signal as a second bitstream to the RF unit via the electrical connector to enable generation, at the RF unit, of an altitude measurement for the vehicle, a speed measurement for the vehicle, or a combination thereof, based on the second bitstream and the time delay.

Example 20 includes the method of Example 19, further including modulating the first bitstream or the second bitstream onto a carrier waveform at a first frequency that is different than a second frequency associated with the output RF signal.

Example 21 includes the method of Example 19 or Example 20, wherein: the calibration RF signal and the sampled digitized signal include a representation of a first watermark; and the output RF signal and the digitized return signal include a representation of a second watermark that is different than the first watermark.

Example 22 includes the method of any of Examples 19 to 21, wherein said transmitting the output RF signal includes: beamforming a plurality of beams via an antenna array according to a beamforming pattern, wherein each beam of the plurality of beams includes a respective selected waveform from a preset family of waveforms.

What is claimed is:

1. A radio device comprising:

a radio frequency (RF) unit including:

first transmit circuitry configured to output, via an electrical connector during a calibration procedure, a calibration RF signal based on a digitized calibration signal;

first receive circuitry configured to receive, via the electrical connector during the calibration procedure, a first bitstream representing a sampled calibration signal; and a processing unit configured to determine a time delay associated with the electrical connector based on the digitized calibration signal and the first bitstream; and a surface-mountable antenna module configured to be coupled to the RF unit via the electrical connector, wherein the surface-mountable antenna module includes:

a housing configured to mount to an external surface of a vehicle;

second receive circuitry configured to receive, via the electrical connector during the calibration procedure, the calibration RF signal; and second transmit circuitry configured to, during the calibration procedure:

sample the calibration RF signal to generate the sampled calibration signal; and output, via the electrical connector, the sampled calibration signal as the first bitstream.

2. The radio device of claim 1, wherein:

the first transmit circuitry is further configured to output, via the electrical connector during a measurement procedure, an output RF signal based on a digitized output signal;

the first receive circuitry is further configured to receive, via the electrical connector during the measurement procedure, a second bitstream representing a digitized return signal; and the processing unit is further configured to determine an altitude measurement for the vehicle, a speed measurement for the vehicle, or a combination thereof, based on the digitized output signal, the second bitstream, and the time delay.

3. The radio device of claim 2, wherein:

the second receive circuitry is further configured to receive, via the electrical connector during the measurement procedure, the output RF signal;

the surface-mountable antenna module further includes an antenna configured to, during the measurement procedure, transmit the output RF signal and receive a return RF signal based on transmission of the output RF signal; and the second transmit circuitry is further configured to:

generate the digitized return signal based on the return RF signal; and output, via the electrical connector, the digitized return signal as the second bitstream.

4. The radio device of claim 3, wherein:

the second transmit circuitry includes:

an analog-to-digital converter (ADC); and a switch coupled to the second receive circuitry, the antenna, and the ADC; and the switch is configured to:

in a first mode, provide the output RF signal to the antenna;

in a second mode, provide the return RF signal to the ADC; and in a third mode, provide the calibration RF signal to the ADC.

5. The radio device of claim 4, wherein:

the surface-mountable antenna module further includes an antenna load;

the switch is further configured to, in a fourth mode, couple the antenna load to the ADC to cause the surface-mountable antenna module to output, via the electrical connector, a load signal as a third bitstream; and the processing unit is further configured to analyze the third bitstream to determine a parameter associated with the surface-mountable antenna module.

6. The radio device of claim 3, wherein the antenna comprises an antenna array.

7. The radio device of claim 6, wherein:

the surface-mountable antenna module further includes a beamformer coupled to the antenna array; and the beamformer is configured to form a plurality of beams according to a beamforming pattern.

8. The radio device of claim 2, wherein:

the RF unit further includes a memory configured to store a representation of the digitized output signal, one or more fast Fourier transform (FFT) samples based on the digitized output signal, or a combination thereof; and the processing unit is further configured to determine the altitude measurement, the speed measurement, or a combination thereof, based on the representation of the digitized output signal, the one or more FFT samples, or a combination thereof, the second bitstream, and the time delay.

9. The radio device of claim 2, wherein the calibration RF signal has a wider bandwidth than the output RF signal.

10. The radio device of claim 2, wherein:

the output RF signal is based on a first coded bit sequence; and the calibration RF signal is based on a second coded bit sequence that is different than the first coded bit sequence.

11. The radio device of claim 1, wherein the electrical connector includes a coaxial cable connector.

12. The radio device of claim 1, wherein the vehicle is an aircraft.

13. A method comprising:

during a calibration procedure at a radio frequency (RF) unit:

generating a calibration RF signal based on a digitized calibration signal;

communicating the calibration RF signal to an antenna module via an electrical connector, wherein the antenna module is coupled to a surface of a vehicle and includes an antenna, and wherein the electrical connector is coupled to the antenna module and the RF unit;

receiving a first bitstream from the antenna module via the electrical connector, wherein the first bitstream represents a sampled calibration signal; and determining a time delay associated with the electrical connector based on the digitized calibration signal and the first bitstream.

14. The method of claim 13, further comprising:

during a measurement procedure at the RF unit:

generating an output RF signal based on a digitized RF signal;

communicating the output RF signal to the antenna module via the electrical connector;

receiving a second bitstream from the antenna module via the electrical connector, wherein the second bitstream represents a digitized return signal; and generating an altitude indication for the vehicle, a speed indication for the vehicle, or a combination thereof, based on the digitized RF signal, the second bitstream, and the time delay.

15. The method of claim 14, wherein said generating the altitude indication, the speed indication, or both, includes:

generating an adjusted return signal based on the second bitstream and the time delay; and calculating a correlation between the digitized RF signal and the adjusted return signal, wherein the altitude indication, the speed indication, or both, are based on the correlation.

16. The method of claim 13, further comprising:

performing the calibration procedure at startup of one or more processors that perform the calibration procedure or according to a fixed calibration schedule.

17. The method of claim 13, further comprising:

performing a periodic delay measurement procedure to generate a delay metric associated with the electrical connector; and performing the calibration procedure based on the delay metric satisfying a threshold.

18. A method comprising:

during a calibration procedure at an antenna module that is coupled to a surface of a vehicle and includes an antenna:

receiving a calibration radio frequency (RF) signal from an RF unit via an electrical connector, wherein the electrical connector is coupled to the RF unit and the antenna module;

sampling the calibration RF signal to generate a sampled digitized signal; and communicating the sampled digitized signal as a first bitstream to the RF unit via the electrical connector to enable generation, at the RF unit, of a time delay associated with the electrical connector.

19. The method of claim 18, further comprising:

during a measurement procedure at the antenna module:

receiving an output RF signal;

transmitting the output RF signal via an antenna;

receiving a return RF signal via the antenna based on the transmission of the output RF signal;

generating a digitized return signal based on the return RF signal; and communicating the digitized return signal as a second bitstream to the RF unit via the electrical connector to enable generation, at the RF unit, of an altitude measurement for the vehicle, a speed measurement for the vehicle, or a combination thereof, based on the second bitstream and the time delay.

20. The method of claim 19, further comprising:

modulating the first bitstream or the second bitstream onto a carrier waveform at a first frequency that is different than a second frequency associated with the output RF signal.

21. The method of claim 19, wherein:

the calibration RF signal and the sampled digitized signal include a representation of a first watermark; and the output RF signal and the digitized return signal include a representation of a second watermark that is different than the first watermark.

22. The method of claim 19, wherein said transmitting the output RF signal includes:

beamforming a plurality of beams via an antenna array according to a beamforming pattern, wherein each beam of the plurality of beams includes a respective selected waveform from a preset family of waveforms.

* * * * *